United States Patent [19]

Murai et al.

[11] Patent Number: 5,195,029
[45] Date of Patent: Mar. 16, 1993

[54] CONTROL UNIT HAVING AN INFERENCE FUNCTION

[75] Inventors: Shuji Murai; Hiroyoshi Yamaguchi; Naoto Otsuka, all of Hiratsuka, Japan

[73] Assignee: Kabushiki Kaisha Komatsu Seisakusho, Japan

[21] Appl. No.: 459,820

[22] PCT Filed: Jul. 20, 1988

[86] PCT No.: PCT/JP88/00726

§ 371 Date: Jan. 16, 1990

§ 102(e) Date: Jan. 16, 1990

[87] PCT Pub. No.: WO89/00726

PCT Pub. Date: Jan. 26, 1989

[30] Foreign Application Priority Data

Jul. 20, 1987 [JP] Japan .................. 62-180764

[51] Int. Cl.⁵ .............. G06F 15/46; G06F 15/18
[52] U.S. Cl. .................. 364/184; 264/40.7; 364/476; 364/551.01; 395/904; 395/912; 425/149
[58] Field of Search .......... 364/476, 473, 184, 550, 364/551.01, 551.02; 395/50, 60, 75, 903, 904, 906, 910, 912, 914, 918; 425/149; 264/40.7

[56] References Cited

U.S. PATENT DOCUMENTS

| | | | |
|---|---|---|---|
| 4,628,434 | 12/1986 | Tashiro et al. | 364/148 X |
| 4,649,515 | 3/1987 | Thompson et al. | 364/184 X |
| 4,674,053 | 6/1987 | Bannai et al. | 364/476 |
| 4,754,410 | 6/1988 | Leech et al. | 364/165 X |
| 4,841,456 | 6/1989 | Hogan, Jr. et al. | 364/550 X |
| 4,916,633 | 4/1990 | Tychonievich et al. | 364/900 X |

FOREIGN PATENT DOCUMENTS 58-29011 2/1983 Japan.
59-117609 7/1984 Japan.
59-127105 7/1984 Japan.
61-88311 5/1986 Japan.

OTHER PUBLICATIONS

"Representing Knowledge About Expectations in Real-Time Expert Advisor for Process Control," Kaemmerer, et al., pp. 809–820; 1986.

*Primary Examiner*—Joseph Ruggiero
*Attorney, Agent, or Firm*—Welsh & Katz, Ltd.

[57] ABSTRACT

A control apparatus having an inference function includes an input unit for inputting situations of problems in a product and a storage unit storing the situations of the problems in the product, causes corresponding to respective situations of the problems and countermeasure plans corresponding to the respective causes, and infers countermeasure plans which are most suitable according to contents stored in the storage unit and the situations of the problems input by the input unit. The apparatus displays countermeasure plans in the course of inference on a display unit during the process of inference, performs the control of an injection machine according to a countermeasure plan when the countermeasure plan has been selected from among the countermeasure plans displayed, and performs the control of the injection machine according to the most suitable countermeasure plan inferred by the inference function when a countermeasure plan has not been selected.

17 Claims, 20 Drawing Sheets

CONTROL UNIT HAVING AN INFERENCE FUNCTION

BACKGROUND OF THE INVENTION

1. Field of the Invention

This invention relates to a control unit having a function of inferring causes for various problems relating to a machine as an object of control, such as problems in the machine as an object of control, problems in a product processed by the machine as an object of control and the like, and countermeasures for dissolving the causes, and more particularly, to a control unit using a so-called expert system in which the knowledge and experiences of high-level specialists in the relating field are accumulated.

2. Description of the Related Art

As a system which infers causes for problems relating to a machine as an object of control and the most suitable countermeasure plans for dissolving the causes, there is a system using a so-called expert system. In the expert system, know-how, that is, knowledge possessed by specialists relating to a specific technique is stored as a knowledge base. When there arises a situation in which the judgment of specialists is required, inference for countermeasure plans is performed by a computer according to the knowledge base so that a correct judgment can be provided as if there exist specialists even when they are absent. The application of this system to various industrial fields is now attracting notice. As a paper describing the application of the expert system to an injection machine the setting of operation conditions of which is considered to be very difficult, there is "Expert Systems for Injection Molding" by Paul M. Menig et al. presented at the meeting "Artificial Intelligence for the Automotive Industry" held on Mar. 11-13, 1986. According to the system presented in this paper, countermeasures for problems are inferred in accordance with the inputs of data on the situations of the problems, various conditions and the like. However, since the system shown in this paper uses a fixed table, that is, a trouble shooting guide provided by DuPont Corp. for determining countermeasure plans for problems in molding, the system has the disadvantages that it is impossible to determine countermeasure plans which must essentially be judged according to the situations of the problems, and time is required or it is sometimes impossible to solve the problems, when there exist, for example, countermeasures which conflict with one another. Furthermore, the system of this paper only asks whether or not the problem has been solved after the execution of a certain countermeasure plan, and actions taken when other problems have occurred as a result of the measures or the situation has changed as a result of the countermeasure are not clear. Hence, it is difficult to operate the system as an expert system from a practical point of view.

As a known example in which the expert system has been applied to other fields, there is a system disclosed in Japanese Patent Public Disclosure (Kokai) No. 62-6845 (1987). In this disclosure, the expert system has been applied to a trouble diagnosis apparatus for vehicles.

However, although the system of this disclosure can be applied to the trouble diagnosis of vehicles, it is unsuitable for complicated control, such as control for an injection machine, that is, the control of the setting of operation conditions of the injection machine, and the like. That is, in the case of an injection machine, the production of good products, for example, sometimes becomes impossible not because the machine and the system do not have troubles, but because the setting of conditions is wrong. The setting of conditions is therefore difficult. For the setting of conditions, an action by combination of various kinds of conditions is required. Hence, the knowledge and experiences of high-level specialists which are totally different from those in the case of the trouble diagnosis of vehicles become necessary.

As described above, since the conventional apparatuses determine a countermeasure plan using a fixed table, they cannot provide actions, for example, when there exist countermeasure plans which conflict with one another, or they cannot be applied to the control of injection molding and the like.

It is an object of the present invention to provide a control apparatus having a inference function in which it is possible to infer countermeasures for problems occurred in a machine as an object of control with least human intervention and to execute the countermeasures inferred.

It is another object of the present invention to provide a control apparatus having an inference function which can control the setting of operation conditions of an injection machine and the like without having specialized knowledge and experiences, and which can deal with various situations.

SUMMARY OF THE INVENTION

A control apparatus having an inference function according to the present invention includes a plurality of sensor means for detecting states of respective units of a machine as an object of control, input means for inputting situations of problems when the problems occur in the machine as an object of control or in a product produced by the machine, inference means including storage means storing situations of the machine as an object of control and a plurality of various countermeasures for the problems, for providing priority order for the problems occurred, priority order for causes for the problems and priority order for countermeasures for the causes according to the states of respective units of the machine as an object of control and contents stored in the storage means, and for inferring a countermeasure which is most suitable, and control means for outputting various kinds of control signals for the machine as an object of control to the machine as an object of control in accordance with the countermeasures inferred by the inference means.

In another aspect of the present invention, a control apparatus includes input means for inputting situations of problems in a product, inference means including storage means storing the situations of the problems in the product, causes corresponding to respective situations of the problems and countermeasure plans corresponding to respective causes, for inferring countermeasure plans which are most suitable according to contents stored in the storage means and the situations of the problems input by the input means, display means for displaying the countermeasure plans in the process of inference, selection means for selecting an arbitrary countermeasure plan from among the countermeasure plans displayed on the display means, and control means for performing the control of an injection machine according to a selected countermeasure plan when the countermeasure plan has been selected by the selection means, and for performing the control of the injection machine according to the most suitable countermeasure plan inferred by the inference means when a countermeasure plan has not been selected by the selection means.

DESCRIPTION OF THE PREFERRED EMBODIMENTS

An embodiment of the present invention will now be explained in detail with reference to the attached drawings.

Figure 1:
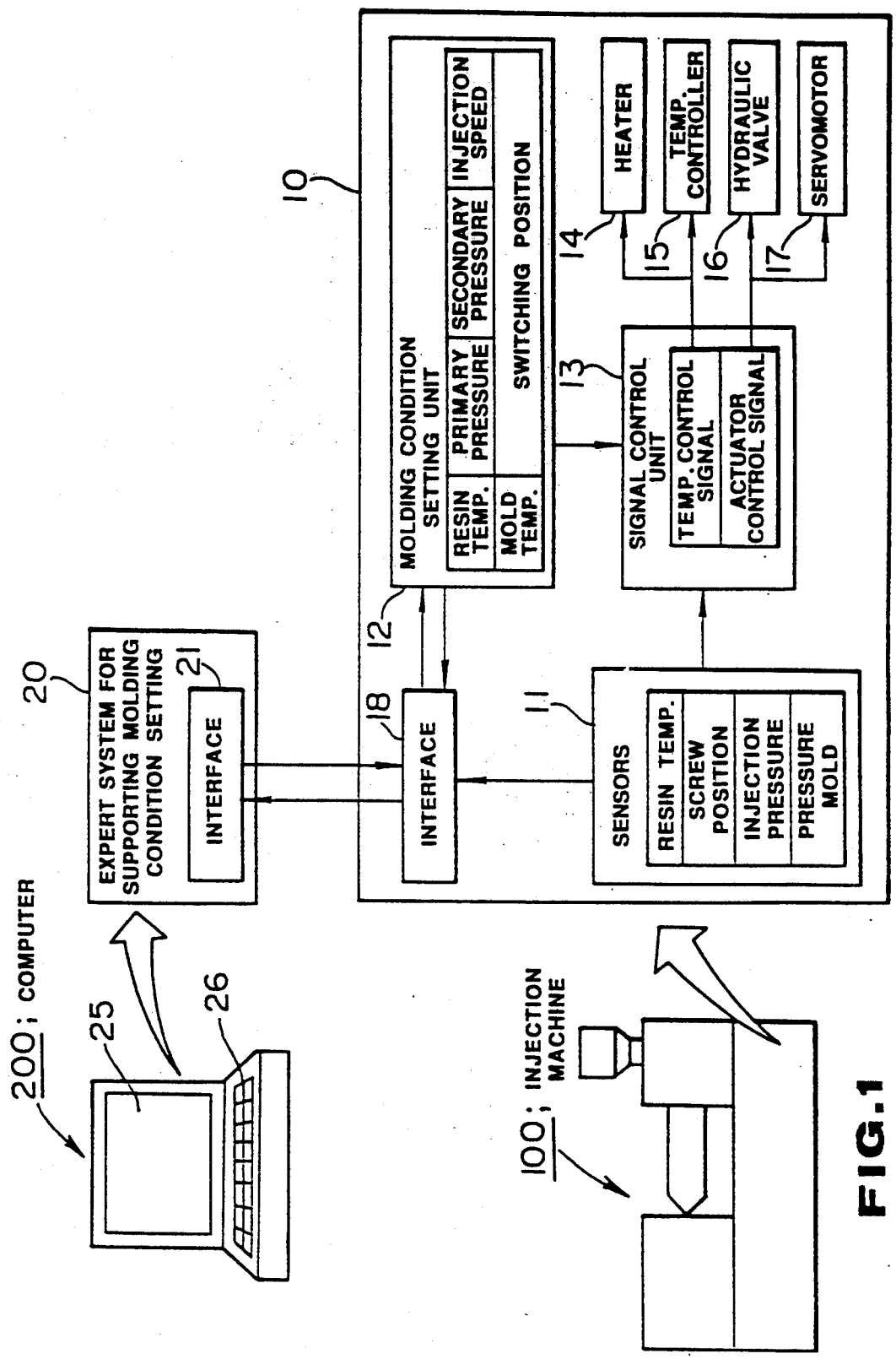
FIG. 1 is a configurational diagram showing the entire configuration of an embodiment of the present invention.

FIG. 1 shows an embodiment when the control apparatus having an inference function of the present invention is applied to a control apparatus for an injection machine. In FIG. 1, the present embodiment is configured by performing on-line connection of an injection machine 100, which is a machine as an object of control, to a computer 200 which constitutes an expert system 20 for supporting the setting of molding conditions. The injection machine 100 includes a control unit 10. The control unit 10 comprises various kinds of sensors 11 for detecting the resin temperature, screw position, injection pressure, pressure within a mold and the like, molding condition setting unit 12 for setting the resin temperature, mold temperature, primary pressure (injection pressure), secondary pressure (keeping pressure), injection speed, switching position for the primary pressure, secondary pressure and injection speed, and the like, signal control unit for generating a temperature control signal, an actuator control signal and the like, a heater controlled by the temperature control signal from the signal control unit 13, a temperature controller 15, a hydraulic valve 16 controlled by the actuator control signal, a servomotor, and an interface 18 for the expert system 20 for supporting the setting of molding conditions.

The expert system 20 for supporting the setting of molding conditions includes an interface 21 for the control unit 10 of the injection machine 100.

In this apparatus, the resin temperature, screw position, injection pressure, mold pressure and the like for the injection machine 100 are detected by the various kinds of sensors 11. The detected outputs are supplied to the expert system 20 for supporting the setting of molding conditions via the interfaces 18 and 21. The outputs from the various kinds of sensors 11 are also supplied to the signal control unit 13. The signal control unit 13 forms temperature control signals for controlling the heater 14 and the temperature controller 15 and actuator control signals for controlling the hydraulic valve 16 and the servomotor 17 in accordance with outputs from the various kinds of sensors 11 and the resin temperature, mold temperature, primary pressure, secondary pressure, injection speed, each switching position set at the molding condition setting unit 12.

Various kinds of setting values set at the molding condition setting unit 12 are supplied to the expert system 20 for supporting the setting of molding conditions via the interfaces 18 and 21.

When problems have occurred in the injection machine 100, the expert system 20 for supporting the setting of molding conditions infers the most suitable plan for countermeasure for the occurrence of the problems according to a procedure, which will be described later, according to the situations of the problems input from a keyboard 26, outputs from the various kinds of sensors 11 input from the interface 21 and various kinds of setting values at the molding condition setting unit 12, and transmits data for changing molding conditions to the molding condition setting unit 12 via the interfaces 21 and 18 in order to execute the countermeasure plan inferred according to the inference.

On the display 25, the contents of input data by the keyboard 26, the data detected by the various kinds of sensors 11, the setting data by the molding condition setting unit 12, the contents of the inference by the expert system 20 for supporting the setting of molding conditions and the like are displayed.

Figure 2:
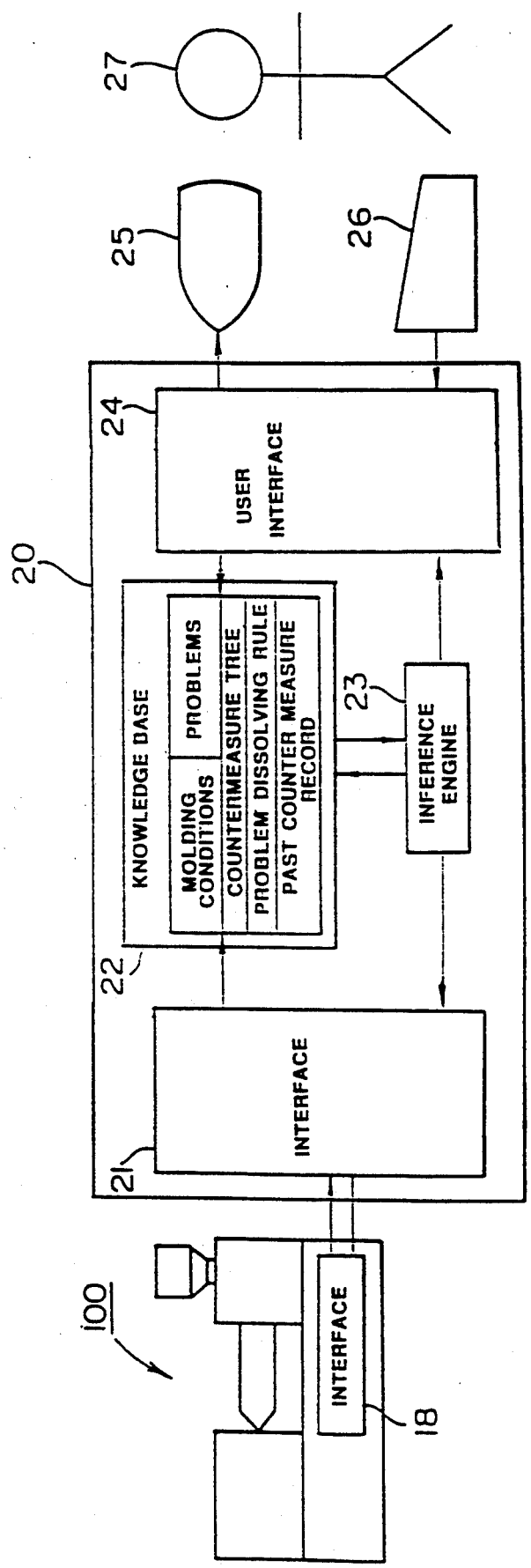
FIG. 2 is a configurational diagram made by paying attention to a part of the embodiment.

FIG. 2 shows the schematic configuration of the expert system 20 for supporting the setting of molding conditions by functional blocks. The expert system 20 for supporting the setting of molding conditions comprises the interface 21 for the injection machine 100, a knowledge base 22 storing molding conditions, situations of problems, a tree of countermeasures for problems, rules for dissolving problems, records of past countermeasures and the like, a user interface 24 for the display 25 and the keyboard 26, and an inference engine 23 which performs a desired inference according to the knowledge stored in the knowledge base 22 and outputs the result of the inference to the interface 21, the user interface 24 and the knowledge base 22.

When problems have occurred relating to the injection machine 100, an operator 27 inputs situations of the problems to the expert system 20 for supporting the setting of molding conditions by the keyboard 26 while watching the situations on the display 25. The data indicating the situations of the problems input from the keyboard 26 supplied to and stored in the knowledge base 22 via the user interface 24. Various kinds of data from the injection machine 100 is supplied to and stored in the knowledge base 22 via the interface 21. The inference engine 23 infers the most suitable plan for a countermeasure for the problems occurred according to the data stored in the knowledge base 22, and supplies the display unit 25 with the result of the inference via the user interface 24. The display unit 25 displays the result. The result of the inference is also transferred to the injection machine 100 via the interface 21, and molding conditions are changed in order to execute the countermeasure plan inferred.

Figure 3:
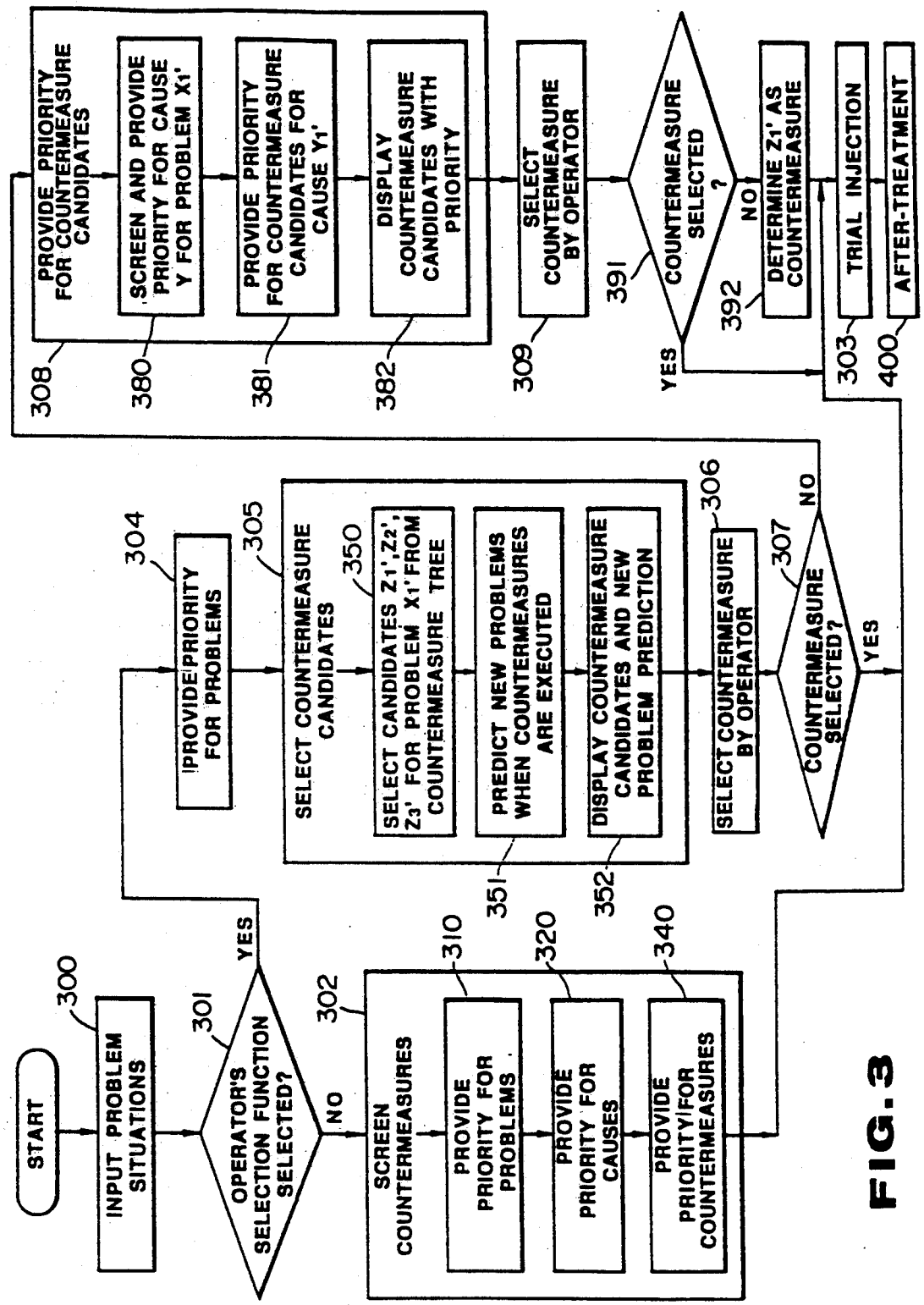
FIG. 3 is a flowchart showing the entire operation of the embodiment.

FIG. 3 shows the entire operation of the present embodiment.

It is to be noted that, in the present embodiment, in general, when a countermeasure plan having the highest priority order for problems occurred is automatically extracted and executed, or when a selection and execution function for a countermeasure plan by the operator function for a countermeasure plan by the operator (hereinafter termed an "operator's selection and execution function") is selected, a countermeasure plan can be selected and executed by the judgment of the operator at the stage when the selection of a candidate for a countermeasure plan has been terminated and at the stage when the provision of priority order for countermeasure plans has been terminated.

First, the input of the situations of the problems occurred is performed at step 300. The input of the situations of the problems is performed by the keyboard 26 by the operator. More specifically, the designation of the problems, materials used and the like are sequentially input in accordance with inquiries displayed on the display 25 according to a predetermined format.

Next, at step 301, it is determined whether or not the "operator's selection and execution function" has been selected. If it has been determined that the "operator's selection and execution function" was not selected, the process proceeds to step 302.

At step 302, screening of countermeasure plans for inferring the most suitable countermeasure plan for the problems occurred is performed according to the current values of molding conditions automatically input from the injection machine 100, the data stored in the knowledge base 22 and the data indicating the situations of the problems occurred which have been input at step 300 described above. The screening of countermeasure plans is performed according to the tree of countermeasures for problems and the rules for solving problems stored in the knowledge base 22 as the basic knowledge and other stored contents.

Figure 4:
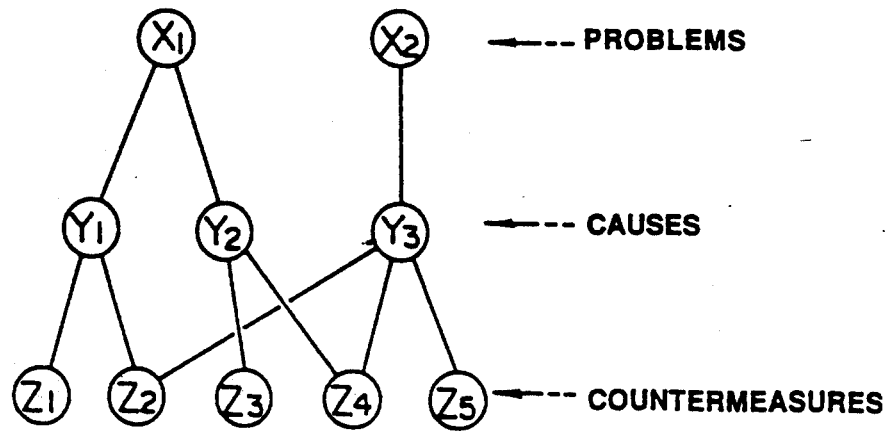
FIG. 4 is a diagram showing a relationship among problems, causes and countermeasures.

FIG. 4 shows an example of the tree of countermeasures for problems. In this tree of countermeasures for problems, events $Y_1$, $Y_2$, $Y_3$,—which represent causes for problems are shown corresponding to events $X_1$, $X_2$,—which represent the problems. Furthermore, events $Z_1$, $Z_2$, $Z_3$, $Z_4$, $Z_5$,—which represent countermeasure plans for the causes are shown corresponding to the events $Y_1$, $Y_2$, $Y_3$,—which represent causes.

FIG. 4 shows that, for the problem represented by the event $X_1$, for example, the causes represented by the events $Y_1$ and $Y_2$ can be considered. Furthermore, for the cause represented by the event $Y_1$, the countermeasure plans represented by the events $Z_1$ and $Z_2$ can be considered, and for the cause represented by the event $Y_2$, the countermeasure plans represented by the events $Z_3$ and $Z_4$ can be considered.

Figure 5:
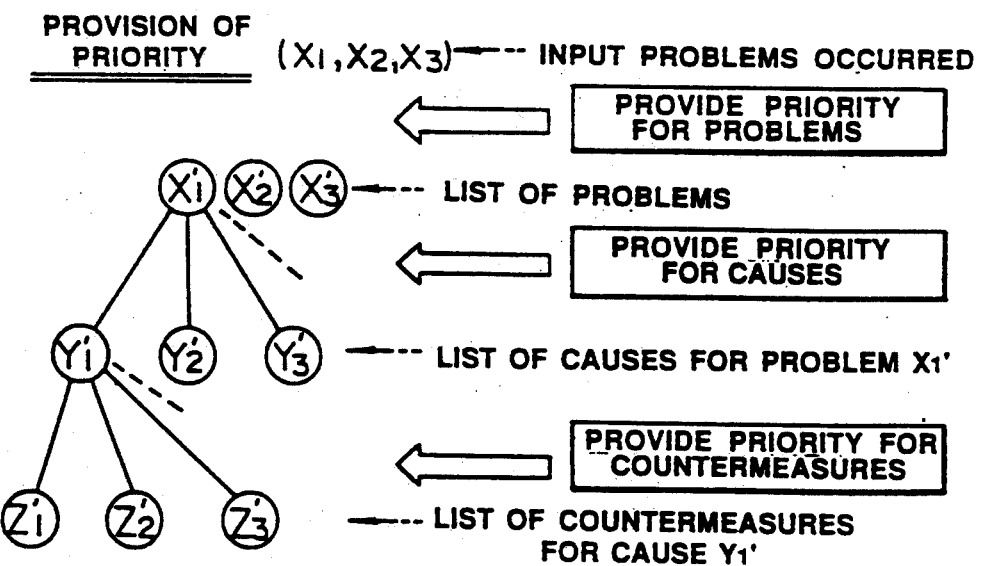
FIG. 5 is an explanatory diagram for explaining the operation for providing priority order.

At step 302, the most suitable countermeasure plan is inferred according to the contents stored in the knowledge base 22. The inference is performed according to the provision of priority order for the problems (step 310), the provision of priority order for the causes (step 320), and the provision of priority order for the plans for countermeasures (step 340). More specifically, as shown in FIG. 5, priority order is first provided in the order of countermeasures to be taken for the problems input ($X_1$, $X_2$, $X_3$,—), and a list of problems ($X'_1$, $X'_2$, $X'_3$,—) is prepared according to the priority order (step 310). Subsequently, a list of causes ($Y'_1$, $Y'_2$, $Y'_3$,—) is prepared according to the priority order for estimated causes made by estimating causes from the situations of the problems for the problem $X'_1$ having the highest priority order (step 320). Furthermore, countermeasure plans which can be considered for the cause $Y'_1$ having the highest priority order are estimated, and a list of countermeasure plans ($Z'_1$, $Z'_2$, $Z'_3$,—) is prepared according to the priority order for the revised countermeasure plans (step 340). The countermeasure plan $Z'_1$ having the highest priority order in the list of countermeasure plans is thereby selected as the most suitable countermeasure plan for the problems input. Molding conditions for the injection machine 100 are thereby automatically set via the interfaces 21 and 18 in order to execute the above-described countermeasure plan $Z'_1$.

Figure 6:
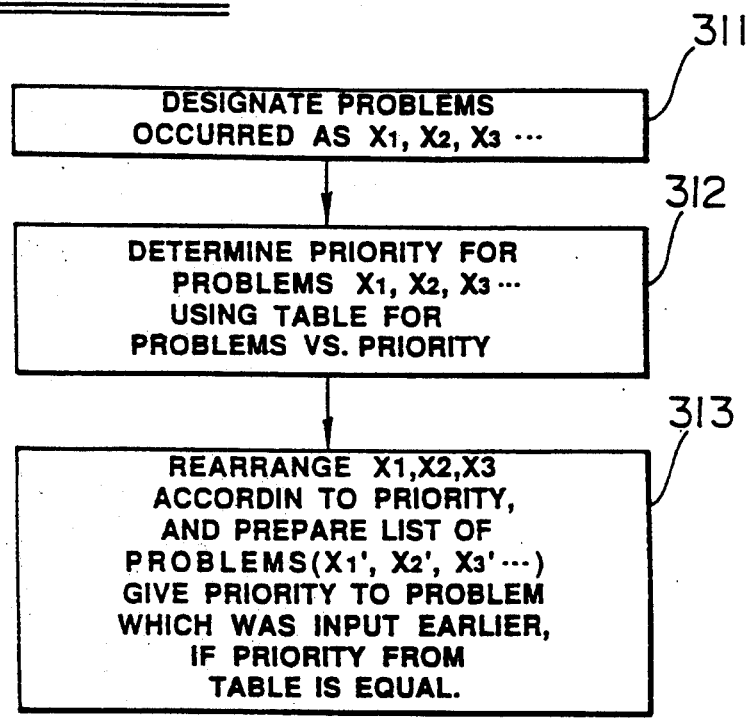
FIGS. 6, 7, 8, 9, 10 and 11 are detailed flowcharts of respective portions in the flowchart shown in FIG. 3.
Figure 7:
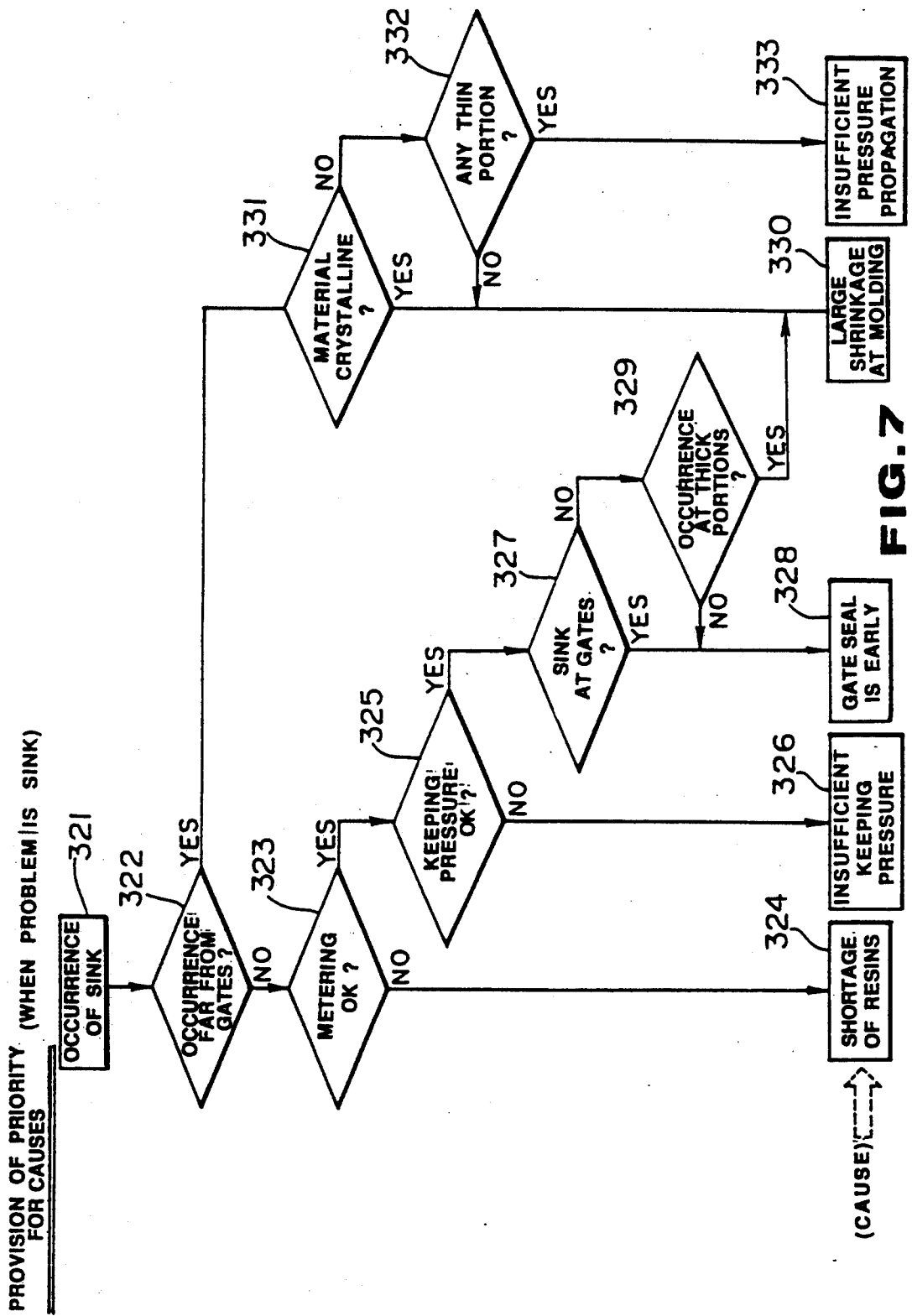
Figure 8:
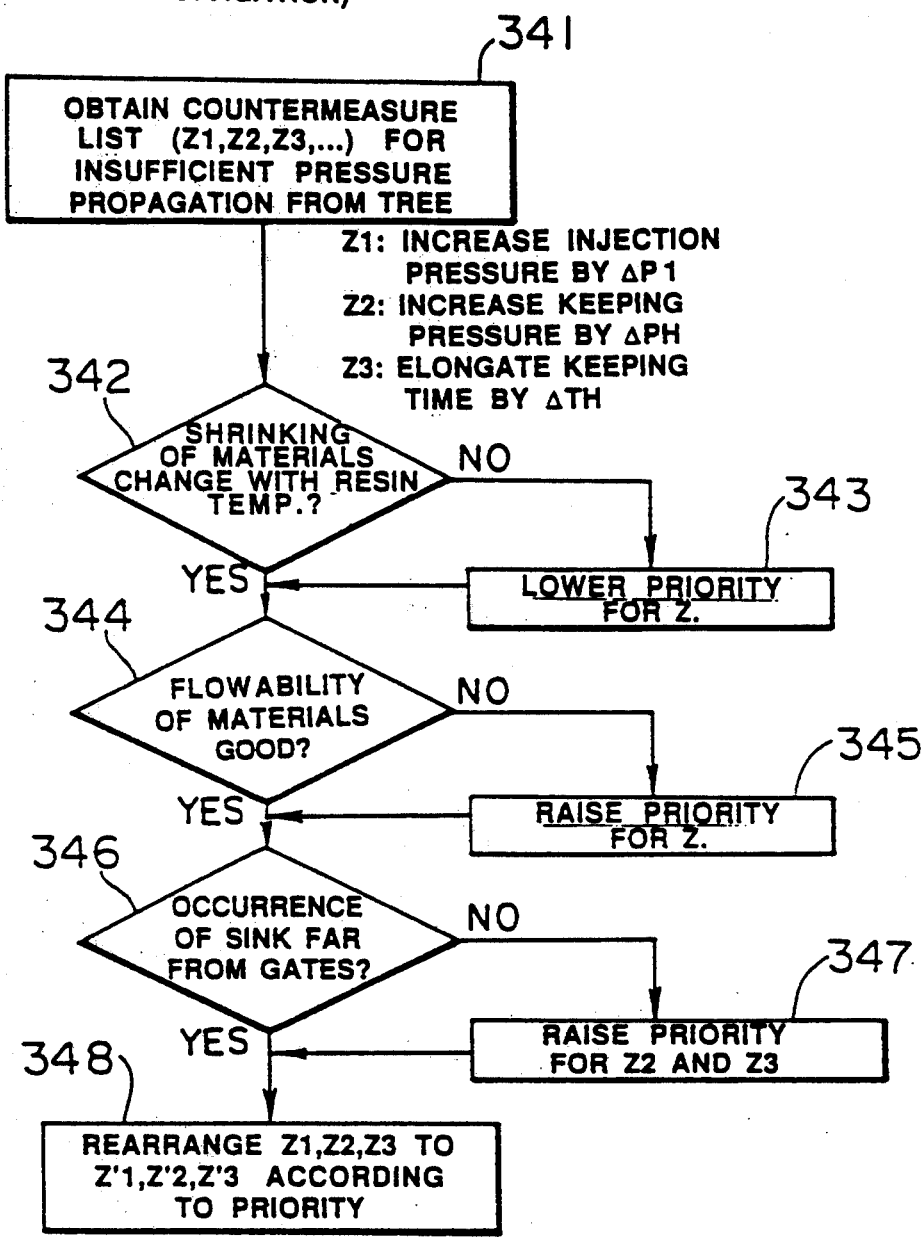

Detailed examples for step 310 for providing the priority order for the problems at step 302, step 320 for providing the priority order for the causes, and step 340 for providing the priority order for the countermeasures are shown in FIGS. 6, 7 and 8, respectively.

That is, in step 310 for providing the priority order for the problems, the specification of the problems input is first performed at step 311, and priority order is provided for the specified problems $X_1$, $X_2$ and $X_3$ using a "correspondence table for problems versus priority order" (not illustrated) stored in the knowledge base 22 at step 312, as shown in FIG. 6. Subsequently, at step 313, the problems for which the priority order has been provided is rearranged according to the priority order to provide the list for problems ($X'_1$, $X'_2$, $X'_3$,—). In this case, when the priority order for problems obtained from the correspondence table for problems versus priority order is equal, priority is given to the problem which has been input earlier.

FIG. 7 shows an example of the processing for providing priority order for causes when the problem occurred is "sink". In FIG. 7, where the problem for the causes of which priority order must be provided is "sink", the process first proceeds from step 321 to step 322, where it is determined whether or not the occurrence of the "sink" is limited to locations far from gates. If it has been determined at step 322 that the occurrence of "sink" is not limited to locations far from gates, but spreads over the entire product, the process proceeds to step 323, where it is checked whether or not materials are properly metered. If there is any problem in the metering of materials at this check, the process proceeds to step 324, where it is inferred that the cause for the problem having the highest priority order is "shortage in the amount of resins".

On the other hand, if it has been determined that the metering of materials is proper at step 323, the process branches to step 325, where it is checked whether or not the keeping pressure is proper. If it has been determined at step 325 that there is any problem in the keeping pressure, the process proceeds to step 326, where it is inferred that the cause for the problem is "insufficient keeping pressure".

If it has been determined at step 325 that the keeping pressure is proper, the process branches to step 327, where it is determined whether or not there occurs "sink" at gate portions. If it has been determined at step 327 that there occurs "sink" at gate portions, the process proceeds to step 328, where it is inferred that the cause for the problem is "gate seal is too early". If it has been determined at step 325 that there occurs no "sink" at gate portions, the process proceeds to 329, where it is determined whether or not the "sink" occurs at thick portions. If it has been determined at step 329 that the "sink" does not occur at thick portions, the process proceeds to step 328, where it is inferred that the cause for the problem is "gate seal is too early". If it has been determined that the "sink" occurs at thick portions, the process proceeds to step 330, where it is inferred that the cause for the problem is "large shrinkage at molding".

If it has been determined at step 322 that the occurrence of the "sink" is limited to locations far from gates, the process branches to step 331, where it is determined whether or not the material used is crystalline. If it has been determined at step 331 that the material used is crystalline, the process proceeds to step 330, where it is inferred that the cause for the problem is "large shrinkage at molding". If it has been determined at step 331 that the material used is not crystalline, the process proceeds to step 332, where it is determined whether or not there exists any thin portion in the midsection. If it has been determined at step 332 that there exists some thin portion in the midsection, the process proceeds to step 333, where it is inferred that the cause for the problem is "insufficient pressure propagation". If it has been determined that there exists no thin portion in the midsection, the process proceeds to step 330, where it is inferred that the cause for the problem is "large shrinkage at forming".

Each determination described above is performed according to data directly taken in from the injection machine 100 via the interface 21 or data input from the keyboard 26 by the operator.

In FIG. 7, there has been shown the inference for causes when the problem is "sink". Also for other problems, causes are similarly inferred, priority order for causes is provided according to the result of the inference, and the list FIG. 8 shows an example of the processing for providing priority orders for plans for countermeasures when the problem is "sink" and the cause is "insufficient pressure propagation".

First, at step 341, a list of plans for countermeasures ($Z_1$, $Z_2$, $Z_3$, ---) for the cause "insufficient pressure propagation" is obtained from the tree of countermeasures for problems stored in the knowledge base 22. It is assumed that the countermeasure plan $Z_1$ is "to increase the injection pressure by $\Delta P_1$", the countermeasure plan $Z_2$ is "to increase the keeping pressure to by $\Delta P_H$", and the countermeasure plan $Z_3$ is "to elongate the time for the keeping pressure by $\Delta T_H$", where $\Delta P_1$, $\Delta P_H$ and $\Delta T_H$ are proper values which have previously been set.

Next, at step 342, it is determined whether or not the shrinking property of the material used changes with the resin temperature. If it has been determined at step 342 that the shrinking property of the material used changes with the resin temperature, the process branches to step 343, where the processing to lower the priority order for the countermeasure plan $Z_1$ is performed.

Next, at step 344, it is determined whether or not the flowability of the material used is good. If it has been determined at step 344 that the flowability of the material used is not good, the process branches to step 345, where the processing to raise the priority order for the countermeasure plan $Z_1$ is performed.

It is further determined whether or not the occurrence of the "sink" is at locations far from gates. If it has been determined that the occurrence of the "sink" is at locations far from gates, the process branches to step 347, where the processing to raise the priority order for countermeasure the plans $Z_2$ and $Z_3$ is performed. After thus executing each determination and each processing, the process proceeds to step 348, where the countermeasure plans $Z_1$, $Z_2$ and $Z_3$ are rearranged according to the priority order, and the processing to prepare the list of countermeasure plans ($Z'_1$, $Z'_2$, $Z'_3$,---) is executed.

FIG. 8, there has been shown an example of the processing for providing priority order for countermeasure plans when the problem is "sink" and the cause is "insufficient pressure propagation". For other problems and causes, priority order for countermeasure plans are similarly provided. Also in these cases, each determination as described above is performed according to data directly taken in from the injection machine 100 via the interface 21 or data input from the keyboard 26 by the operator.

Figure 9:
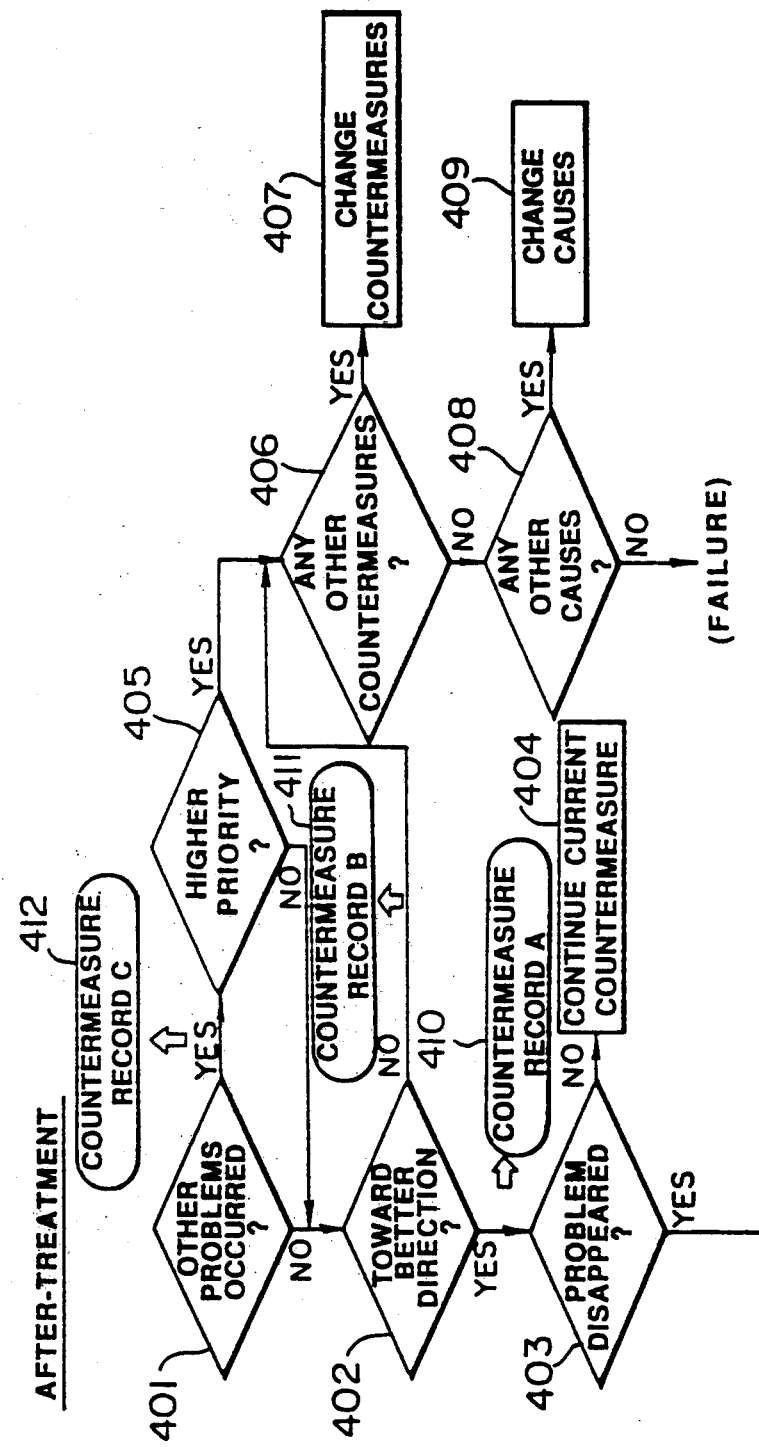

When the most suitable countermeasure plan for the problem occurred is selected at step 302 (shown in FIG. 3) and the molding conditions for the injection machine 100 is automatically set in order to execute the above-described countermeasure plan $Z'_1$ via the interfaces 21 and 18, the process proceeds to step 303, where trial injection by the injection machine 100 is performed in a state in which the countermeasure plan $Z'_1$ is executed. The process then proceeds to step 400, where after-treatment for the above-described trail injection is executed. A detailed example of the after-treatment at step 400 is shown in FIG. 9.

First, at step 401, it is determined whether or not any other problems have occurred relating to the above-described trail injection for which the countermeasure plan $Z'_1$ was executed. If it has been determined at step 401 that no other problems occurred, the process proceeds to step 402, where it is determined whether or not the problem to be processed with the countermeasure plan has gone in a better direction. If it has been determined that the problem went in a better direction, the process proceeds to step 403, where it is determined whether or not the problem to be processed with the countermeasure disappeared. If it has been determined that the problem did not disappear, the process proceeds to step 404, where the current countermeasure plan is continued. If it has been determined that the problem disappeared, the process proceeds to the processing for countermeasure plans for the next problem for which countermeasures have not been executed.

If it has been determined at step 401 that any other problems occurred relating to the above-described trial injection for which the countermeasure plan $Z'_1$ was executed, the process branches to step 405, where it is determined whether or not the problem newly occurred has a priority order which is higher than that at for the problem for which it was tried to execute the countermeasure. If it has been determined at step 405 that the priority order is low, the process proceeds to step 402, where a processing similar to that described above is executed. If it has been determined at step 405 that the priority order for the problem newly occurred is higher than that for the problem for which it was tried to execute the countermeasure the step branches to step 46, where is determined whether or not there are any plans for countermeasures which have not been adopted yet in the list of countermeasure plans inferred at step 301 (shown in FIG. 3). If it has been determined at step 406 that there are countermeasure plans which have not been adopted yet at step 406, the process proceeds to step 407, where the plan countermeasure plan having the highest 7 priority order among countermeasure plans which have not been adopted yet is selected, and the processing to switch to this countermeasure plan is executed. For example, when the countermeasure plan $Z'_1$ in the above-described list of countermeasure plans ($Z'_1$, $Z'_2$, $Z'_3$— ) has been executed and the process has proceeded to step 407, the countermeasure plan $Z'_1$ is removed from the list of countermeasure plans, the countermeasure plan $Z'_2$ is selected from the list of remaining countermeasure plans ($Z'_2$, $Z'_3$, — ), and the processing to switch from the countermeasure plan $Z'_1$ to the countermeasure plan $Z'_2$ is executed.

If it has been determined at step 406 that there is no countermeasure plans which have not been adopted yet at step 406, the process proceeds to step 408, where it is determined whether or not there are any causes which have not been adopted yet. If it has been determined that there are any causes which were not adopted yet at step 408, the process proceeds to step 409, where the cause having the highest priority order among the causes which have not been adopted yet is selected, and the processing to switch to the processing according to this cause is executed. For example, when all the countermeasure plans in the above-described list of countermeasure plans ($Z'_1$, $Z'_2$, $Z'_3$, —) have been adopted, the already-adopted cause $Y'_1$ is removed from the list of causes ($Y'_1$, $Y'_2$, $Y'_3$, —), the cause $Y'_2$ having the highest priority order is selected from the list of remaining causes ($Y'_2$, $Y'_3$, —), and the processing to adopt the cause $Y'_2$ in place of the cause $Y'_1$ is executed. If it has been determined at step 408 that there remain no causes which were not adopted yet, the situation is named "failure", and a predetermined processing based thereon is performed.

If it has been determined at step 402 that the problem did not go in a better direction, the process branches to step 406, where a processing similar to that described above after step 406 is performed.

When it has been determined at step 402 that the problem went in a better direction due to the execution of the countermeasure plan $Z'_i$ (i=1, 2, 3, —), the record is collected as the record A of the countermeasure at step 410. When the problem did not go in a better direction, the record is collected as the record B of the countermeasure at step 411. When other problem occurred due to the execution of the countermeasure plan $Z'_1$ at step 401, the record is collected as the record C of the countermeasure at step 412.

Each determination shown in FIG. 9 is performed according to data input from the keyboard 26 by the operator, data directly input from the injection machine 100 via the interface 21, and the data stored in the knowledge base 22.

The records A, B and C of the countermeasures collected at steps 410, 411 and 412, respectively, are used for inferring the possibility for the occurrence of problems due to the execution of the countermeasure plan $Z'_i$.

Figure 10:
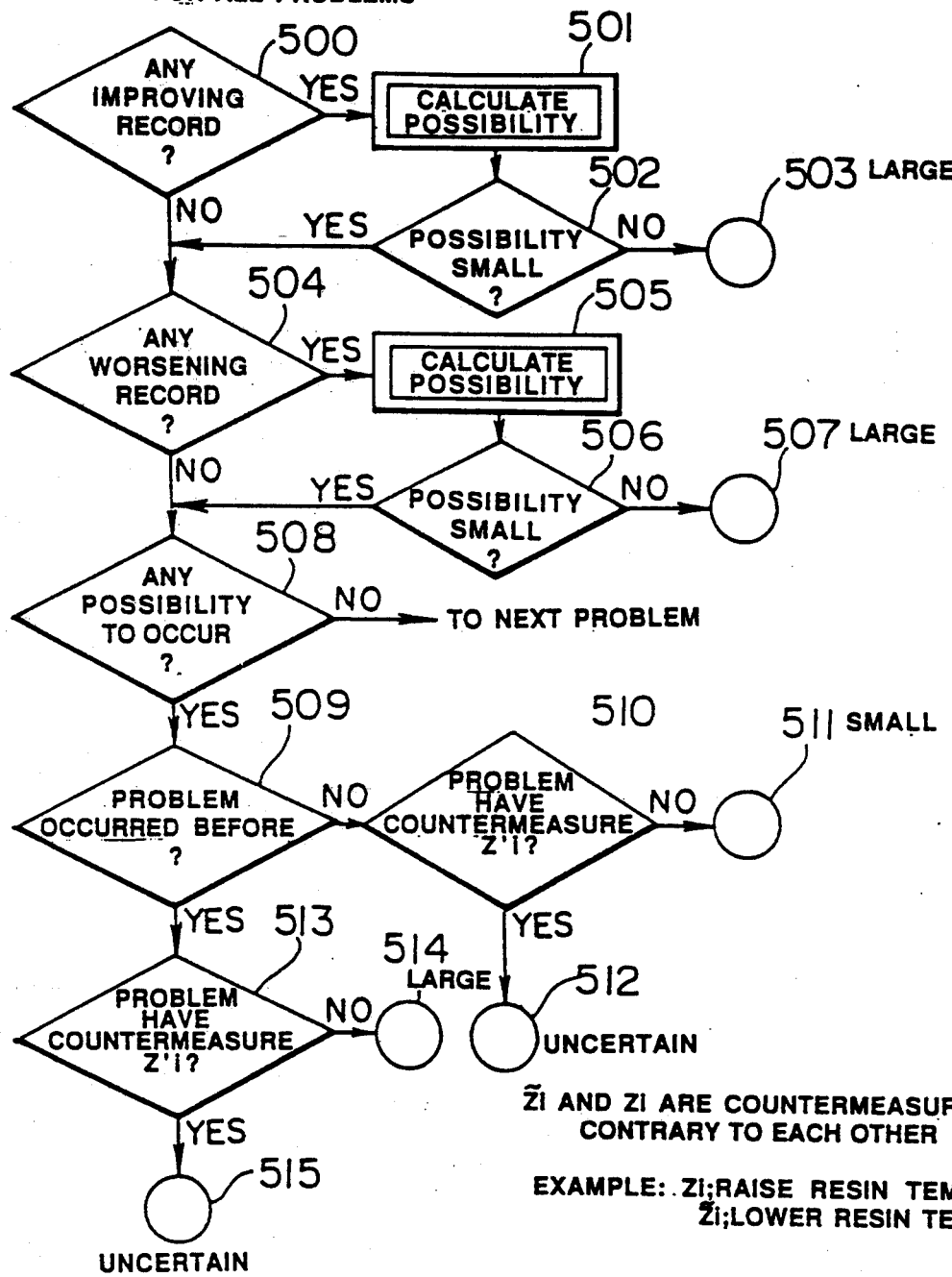

FIG. 10 shows the above-described processing for inferring the possibility for the occurrence of problems.

First, at step 500, it is determined whether or not there is a record in which the problem went in a better direction as a result of the execution of the countermeasure plan $Z'_i$ according to the record A of the countermeasure. If there is a record in which the problem went in a better direction at step 500, the process branches to step 501, where the possibility for the betterment is calculated. It is determined whether or not the result of the calculation for the possibility is "small" at step 502. If it has been determined at step 502 that the possibility is not "small", the process proceeds to step 503, where the possibility for the occurrence of the problem is "large".

When it has been determined that there is not record of betterment in the record A of the countermeasure at step 500, and it has been determined that the possibility is "small" at step 502, the process proceeds to step 504, where it is determined whether or not there is any record that the problem to be processed with the countermeasure plan went in a worse direction due to the execution of the countermeasure plan $Z'_i$ according to the record B of the countermeasure. If it has been determined at step 504 that there is a record of going in a worse direction, the process proceeds to step 505, where the possibility for going in a worse direction is calculated. It is determined whether or not the result of the calculation is "small" at step 506. If it has been determined at step 506 that the result of the calculation is not "small", the process proceeds to step 507, where it is inferred that the possibility for the occurrence of the problem is "large".

When it has been determined at step 504 that there is no record of going in a worse direction in the record B of the countermeasure, and it has been determined that the possibility is "small" at step 506, the process proceeds to step 508, where it is determined whether or not there is any possibility for the occurrence of the problem due to the execution of the countermeasure plan $Z'_i$. If it has been determined at step 508 that there is no possibility of the occurrence of the problem, the process proceeds to the processing for inferring the possibility for the next problem.

If it has been determined at step 508 that there is any possibility for the occurrence of the problem, it is determined whether or not the problem occurred in the past according to the records A, B and C of countermeasures at the next step 509. If it has been determined at step 509 that the problem did not occur in the past, the process branches to step 510, where it is determined whether or not the problem occurred has the countermeasure plan $Z'_i$ which is contrary to the countermeasure plan $Z'_i$. If it has been determined at step 510 that the problem does not have the countermeasure plan $Z'_i$, the process proceeds to step 511, where it is inferred that the possibility for the occurrence of the problem is "small".

If it has been determined at step 509 that the problem occurred in the past, it is determined whether or not the problem has the countermeasure plan $Z'_i$ which is contrary to the countermeasure plan $Z'_i$ at the next step 513. If it has been determined at step 513 that the problem does not have the countermeasure plan $Z'_i$, the process proceeds to step 514, where it is inferred that the possibility for the occurrence of the problem is "large".

When it has been determined at step 510 that the problem has the countermeasure plan $Z'_i$ and it has been determined at step 513 that the problem has the countermeasure plan $Z'_i$, the process proceeds to steps 512 and 515, respectively. In this case, it is determined that the possibility for the occurrence of the problem is "uncertain".

Figure 11:
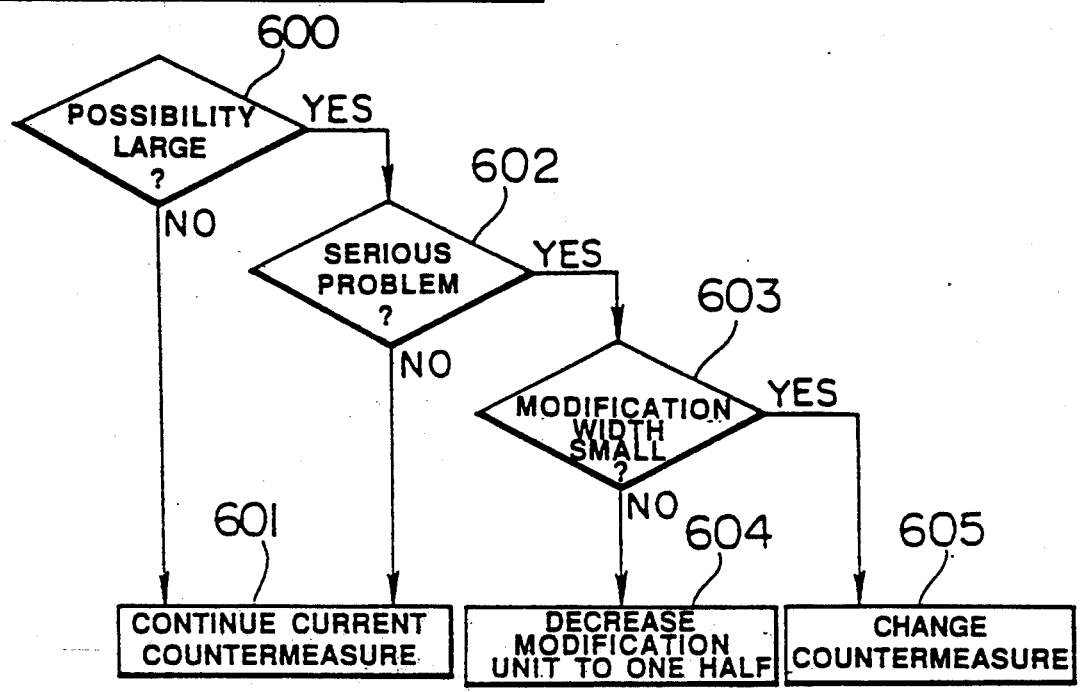

If it has been inferred whether the possibility for the occurrence of the problem is "large" or "small" according to the flowchart shown in FIG. 10, the processing shown in FIG. 11 is executed according the result of the inference.

In FIG. 11, first, it is determined whether or not the possibility for the occurrence of the problem is "large" at step 600. If it has been determined at step 600 that the possibility for the occurrence of the problem is not "large", the process proceeds to step 601, where the processing to continue the current countermeasure plan is executed.

If it has been determined at step 600 that the possibility for the occurrence of the problem is "large", it is determined whether or not the problem occurred is a serious problem at the next step 602. If it has been determined at step 602 that the problem is not a serious problem, the process proceeds to the above-described step 601, where the processing to continue the current countermeasure plan is executed. To the contrary, if it has been determined at step 602 that the problem is a serious problem, the process branches to step 603, where it is determined whether or not the unit of modification for the countermeasure plan $Z'_i$ is minute. If it has been determined at step 603 that the unit is not minute, the process proceeds to step 604, where the unit of modification is reduced to one half. If it has been determined at step 603 that the unit is minute, the process proceeds to step 605, where the processing to switch to other countermeasure plan is executed (that is, the priority order for this countermeasure plan is lowered).

When one problem has thus been released, the provision of priority order for causes, the provision of priority order for countermeasure plans, trial injection and after-treatment are performed for remaining problems which currently occur, and this operation is repeated until the list of problems becomes vacant.

At step 301 shown in FIG. 3, if it has been determined that the "operator's selection and execution function", which makes possible the selection and execution of a countermeasure plan by the operator, was selected, the process proceeds to step 304. At step 304, the provision of priority order for the problems input is executed. The processing for providing priority order for problems at step 304 is identical to the processing for providing priority order for problems at the above-described step 310. That is, by executing a processing identical to the processing shown in FIG. 6, a predetermined processing for providing priority order is performed for the problems $X_1$, $X_2$, $X_3$, ---occurred (the problems input at step 300) to obtain the list of problems ($X'_1$, $X'_2$, $X'_3$, ---).

Next, the process proceeds to step 305, where the processing for selecting candidates for plans for countermeasures is executed.

The processing for selecting candidates for countermeasure plans is performed as follows. First, at step 350, the candidates $Z'_1$, $Z'_2$, $Z'_3$,---for countermeasure plans for the problem $X'_1$ are selected using the tree of countermeasure plans for problems to prepare a list of candidates for countermeasure plans ($Z'_1$, $Z'_2$, $Z'_3$,---). Then, at step 351, prediction of problems which have the possibility to newly occur when respective countermeasure plans $Z'_1$, $Z'_2$, $Z'_3$,---are executed. The prediction for problems is achieved by performing a processing similar to the above-described processing shown in FIG. 10. The countermeasure plans $Z'_1$, $Z'_2$, $Z'_3$,---selected at step 350 and the problems predicted to newly occur due to the execution of respective countermeasure plans $Z'_1$, $Z'_2$, $Z'_3$,---at step 351 are displayed on the display 25 shown in FIG. 2 at step 352.

As described above, at step 305 for the processing for selecting candidates for countermeasure plans, the selection of the candidates $Z_1$, $Z_2$, $Z_3$,---for countermeasure plans for the problem $X'_1$ having the highest priority order among the problems $X_1$, $X_2$, $X_3$,---input and the prediction for problems which will newly occur due to the execution of the selected countermeasures are performed, and the selected candidates $Z_1$, $Z_2$, $Z_3$,---for countermeasure plans are displayed on the display 25 shown in FIG. 2 together with the predicted problems.

At step 305, the operator can select a countermeasure plan while watching the display on the display 25 (step 306). If a countermeasure plan has been selected from among the candidates displayed on the display 25 by the operator, molding conditions for the injection machine 100 are automatically set in accordance with the selected countermeasure plan.

Subsequently, the process proceeds to step 307, where it is determined whether or not the selection of a countermeasure plan has been performed at step 306. If it has been determined at step 307 that a countermeasure plan was selected, the process immediately proceeds to step 303, where trial injection is performed according to the molding conditions which have automatically been set as described above. The process then proceeds to step 400, where predetermined after-treatment is performed. The detail of the after-treatment is as described before.

If it has been determined at step 307 that the selection of a countermeasure plan was not performed at step 306, the process branches to step 308, where the processing for providing priority order for candidates for countermeasure plans is executed. As to the processing for providing priority order for candidates for countermeasure plans, first, the screening of the cause Y for the problem $X'_1$ and the processing for providing priority order are performed at step 380. This processing at step 380 is similar to the processing for providing priority order for causes at step 320 described above. That is, causes are estimated for the problem $X'_1$ having the highest priority order according to the "rules for solving problems", priority order is provided for the causes inferred, and a list of causes ($Y'_1$, $Y'_2$, $Y'_3$,---)is formed. An example of the inference for forming the list for causes is shown in FIG. 7 described above.

Next, priority order for candidates for countermeasure plans for the cause $Y'_1$ is provided at step 381. The processing at step 381 is identical to the processing for providing priority order for countermeasure plans at step 340 described above. That is, countermeasure plans which can be considered for the cause $Y'_1$ having the highest priority order are estimated according to the "rules for dissolving problems", priority order is provided for countermeasure plans inferred, and a list of countermeasure plans ($Z'_1$, $Z'_2$, $Z'_3$,---)is prepared.

Subsequently, the process proceeds to step 382, where the countermeasure plans $Z'_1$, $Z'_2$, $Z'_3$, ---provided with priority order at step 381 are displayed on the display 25 shown in FIG. 2. Furthermore, at step 382, new problems predicted to occur due to the execution of the respective countermeasure plans $Z'_1$, $Z'_2$, $Z'_3$,---may be inferred, and displayed together.

The process then proceeds to step 309. At step 309, it is possible to select either one of the countermeasure plans $Z'_1$, $Z'_2$, $Z'_3$,---displayed at the above-described step 382 by the operator.

If the selection of a countermeasure plan has been performed by the operator at step 309, molding conditions for the injection machine 100 is automatically set in accordance with the selected countermeasure plan.

The process then proceeds to step 391, where it is determined whether or not the selection of a countermeasure plan by the operator at step 309 has been performed. If it has been determined at step 391 that the selection of a countermeasure plan by the operator was performed, the process immediately branches to step 303, where trial injection is performed under the molding conditions which have automatically been set as described above. The process then proceeds to step 400, where predetermined after-treatment is performed.

If it has been determined at step 391 that the selection of a countermeasure plan by the operator was not performed, the process proceeds to step 392, where the processing for adopting the countermeasure plan $Z'_1$ having the highest priority order which has been inferred at step 381 is performed. That is, in this case, by the adoption of the countermeasure plan $Z'_1$, molding conditions for the injection machine 100 are automatically set in accordance with the countermeasure plan $Z'_1$.

Subsequently, the process proceeds to step 303, where trial injection is performed under the molding conditions which have automatically been set as described above, and the process then proceeds to step 400, where predetermined after-treatment is performed.

Thus, the operator can automatically set the most suitable molding conditions for the injection machine 100 only by inputting or selecting data using the keyboard 26, if necessary, for inquiries via the display 25. Furthermore, at steps 306 and 309, arbitrary selection of a countermeasure plan by the operator while watching a display on the display 25 becomes possible. Accordingly, when the operator is an expert in injection molding, it is possible to instantly execute a countermeasure plan with omitting inquiries to be subsequently performed by selecting the countermeasure plan from among the countermeasure plans displayed at steps 306 and 309, and the determination for the countermeasure plan can be performed through a minimum number of responses.

Figure 12:
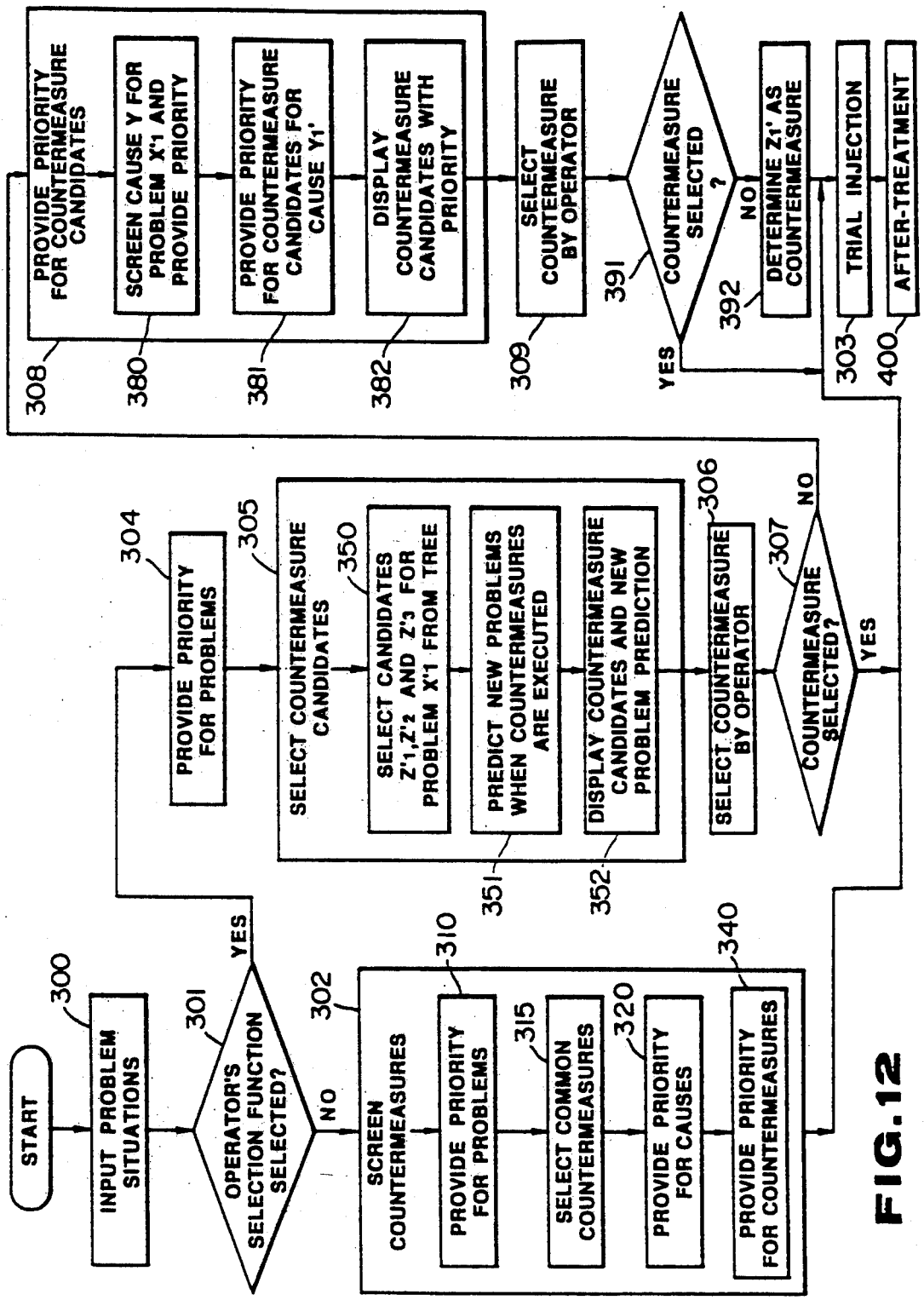
FIG. 12 is a flowchart showing the entire operation of another embodiment.

FIG. 12 shows another embodiment of the present invention in the flowchart of the entire operation. The present embodiment is configured by adding the processing for the selection of common countermeasures shown at step 315 to the embodiment shown in FIG. 3.

In the added step 315, the processing for selecting common countermeasures for a plurality of problems input is executed.

Figure 13:
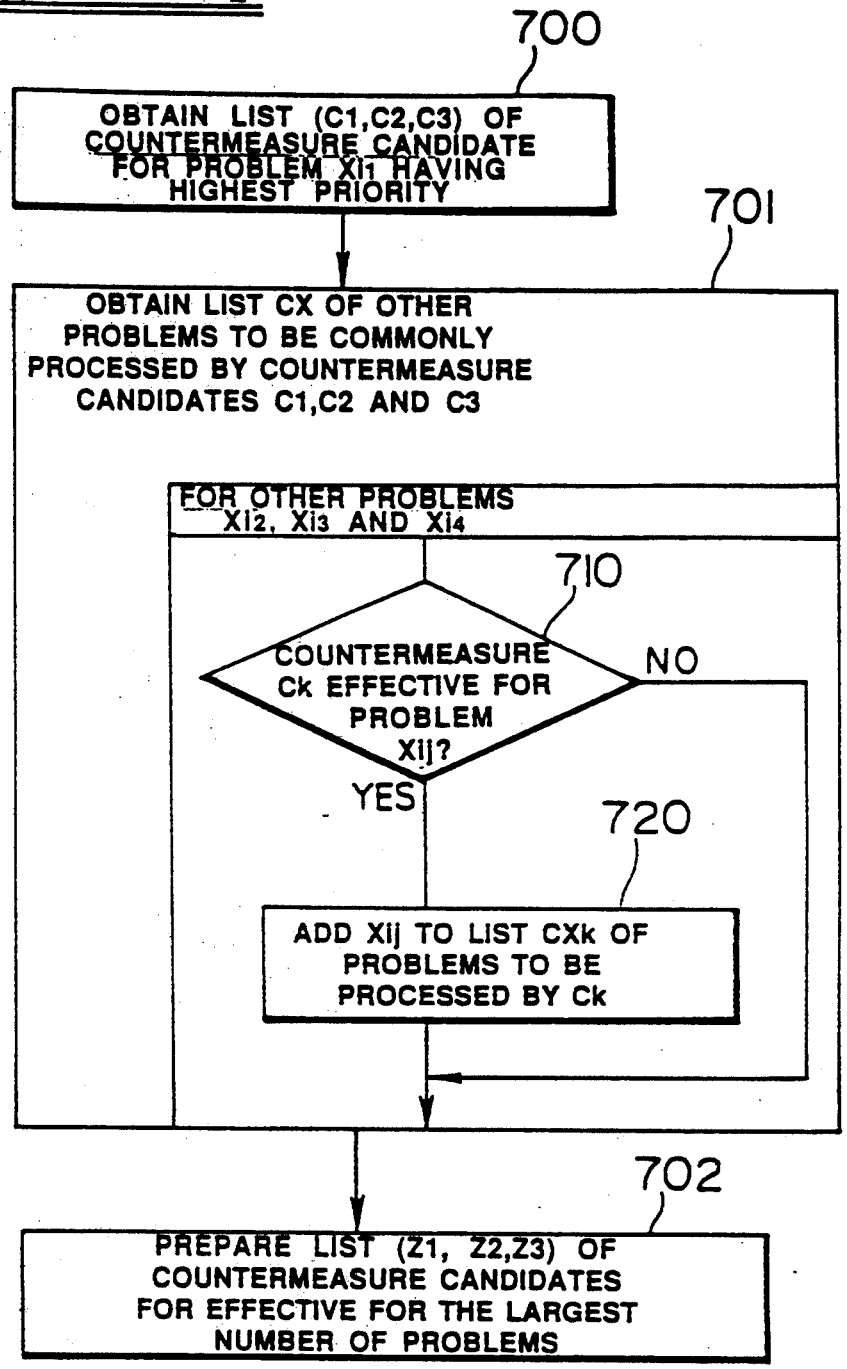
FIG. 13 is a detailed flowchart of a part of the flowchart shown in FIG. 12.

FIG. 13 shows an example of the processing for selecting common countermeasures shown at step 315. In FIG. 13, first, a list of candidates ($C_1$, $C_2$, $C_3$,---)for countermeasures for the problem $X_{i1}$ having the highest priority order is obtained at step 700. The list of candidates for countermeasures is prepared using the tree of countermeasures for problems stored in the knowledge base 22.

Next, at step 701, the effectiveness of the respective candidates $C_1$, $C_2$, $C_3$,---for countermeasures for other problems $X_{i1}$, $X_{i2}$, $X_{i3}$,---is inferred from the above-described tree of countermeasures for problems, and a list CX of other problems for which countermeasures can be taken in common is prepared. The preparation of the list CX of problems is performed by sequentially determining whether or not the respective candidates $C_1$, $C_2$, $C_3$,---for countermeasures are effective for the other problems $X_{i2}$, $X_{i3}$,---. That is, first, it is determined whether or not a candidate $C_k(k=1, 2, 3,---)$for a countermeasure is effective for the problem $X_{ij}(j=2, 3,---)$at step 710. If it has been determined at step 710 that the candidate $C_k$ for a countermeasure is effective for the problem $X_{ij}$, the process proceeds to step 720, where the problem $X_{ij}$ is added to a list $CX_k(k=1, 2, 3,---)$of problems for which a countermeasure can be taken by the candidate $C_k$ for a countermeasure. By executing the above-described processing for all the candidates for countermeasures and problems input, a plurality of list $CX_k$ of problems for which countermeasures can be taken by respective candidates $C_1$, $C_2$, $C_3$,---for countermeasures are formed.

Subsequently, the process proceeds to step 702, where a list of candidates for countermeasures ($Z_1$, $Z_2$, $Z_3$,---) which are effective in common for the largest number of problems is prepared using the plural lists for problems $CX_k$ formed at step 701. When the selection of common countermeasures has been performed at step 315, that is, when the list of candidates for countermeasures ($Z_1$, $Z_2$, $Z_3$,---) which are effective in common for the largest number of problems has been formed, the process proceeds to the next step 320, where the processing for providing priority order for causes is executed. The process then proceeds to step 340, where the processing for providing priority order for countermeasures is executed. The contents of the processing at steps 320 and 340 are nearly identical to those shown in FIG. 3 or FIG. 10. The processing at these steps is performed basically according to the above-described rules for dissolving problems stored in the knowledge base 22. In the present embodiment, however, the above-described processing for providing priority order for causes and countermeasures is performed according to the list of candidates for countermeasures ($Z_1$, $Z_2$, $Z_3$,---) which are effective in common for the largest number of problems which has been formed at step 315.

Thus, in the present embodiment, when a plurality of problems simultaneously occur, a function for screening countermeasures which are common for these problems is added. Wence, it becomes possible to process the most suitable countermeasure in a short time.

Figure 14:
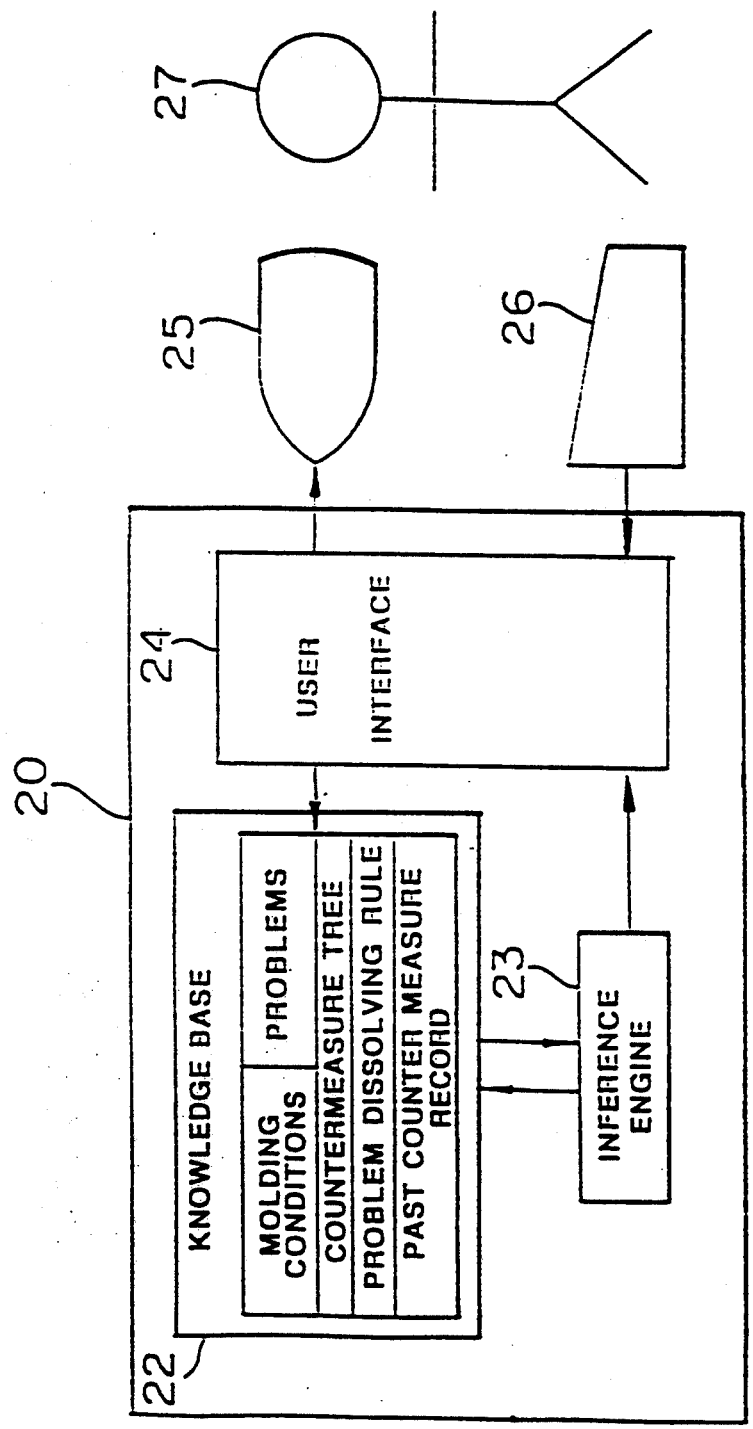
FIG. 14 is a configurational diagram showing the entire configuration of still another embodiment.

FIG. 14 shows still another embodiment of the present invention. In the present embodiment, an expert system for supporting the setting of molding conditions is subjected to off-line connection to an injection machine as an object of control. Furthermore, in the present embodiment, the expert system has a function which can determine countermeasure plans capable of simultaneously improving a plurality of problems, when these problems similarly occur. In addition, in the present embodiment, by recording changes in situations of problems due to the execution of countermeasures and referring to this record when the subsequent countermeasure plans are determined, the system is configured so that the possibility for failure is largely lowered and problems can be improved more promptly.

The expert system 20 for supporting the setting of molding conditions comprises a knowledge base 22 which stores molding conditions, situations of problems, a tree of countermeasures for problems, rules for solving problems, records of past countermeasures and the like, a display 25, a user interface 24 for a keyboard 26, an inference engine 23 which performs a desired inference according to the knowledge stored in the knowledge base 22 and outputs the result of the inference to the interface 21, the user interface 24 and the knowledge base 22.

When problems occur in a product formed by an injection machine, an operator 27 input situations of the problems to the expert system 20 for supporting the setting of molding conditions by the keyboard 26 while watching the display 25. The data indicating the situations of the problems input from the keyboard 26 are added to and stored in the knowledge base 22 via the user interface 24.

The inference engine 23 infers the most suitable countermeasure for the problems occured based on the data input from the keyboard 26 by the operator 27 according to the data stored in the knowledge base 22 and predetermined inquiries, adds the result of the inference to the display 25 via the user interface 24. The display 25 displays the result.

Figure 15:
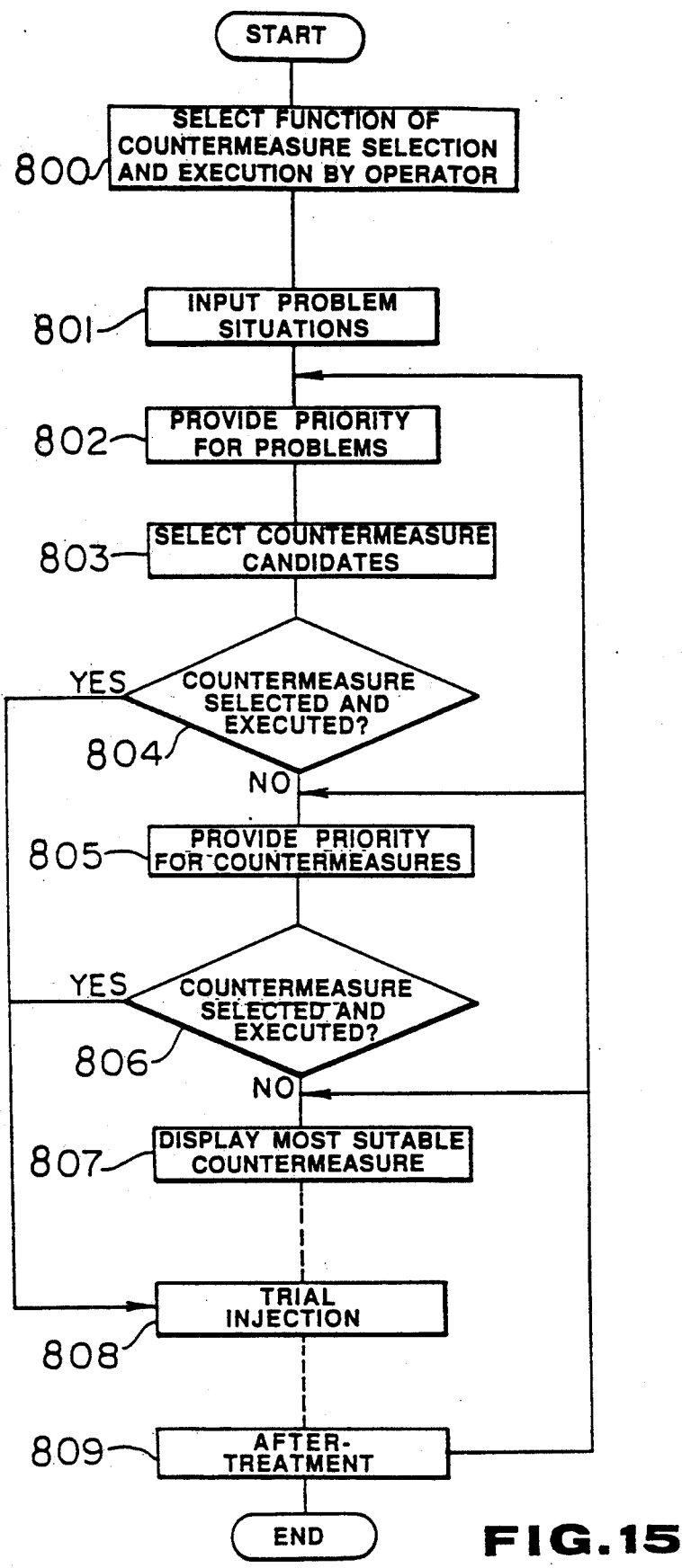
FIG. 15 is a flowchart showing the entire operation of the embodiment shown in FIG. 14.

FIG. 15 shows the flowchart of the entire operation of the present embodiment.

First, at step 800, a function for selecting and executing countermeasure plans by the operator is selected. Subsequently, at step 801, the situations of the problems are input. The input of the situations of the problems is performed by the keyboard 26 by the operator. More specifically, the designation of the problems, materials used and the like are sequentially input in response to inquiries which are displayed on the display 25 in accordance with a predetermined format.

Next, at step 802, the processing for providing priority order for the problems $X_1, X_2, X_3$,---input at step 801 is executed. The processing for providing priority order is identical to that shown in FIG. 6. That is, priority order is determined for the problems $X_1, X_2, X_3$,-- -occurred using a correspondence table for problems versus priority order which has previously been prepared, the problems $X_1, X_2, X_3$,---are rearranged according to the priority order, and a list of problems ($X'_1, X'_2, X'_3$---) is prepared.

The process then proceeds to step 803, where the processing for selecting candidates for countermeasure plans is executed. The detail of the processing for selecting candidates for countermeasure plans is shown in FIG. 16.

Figure 16:
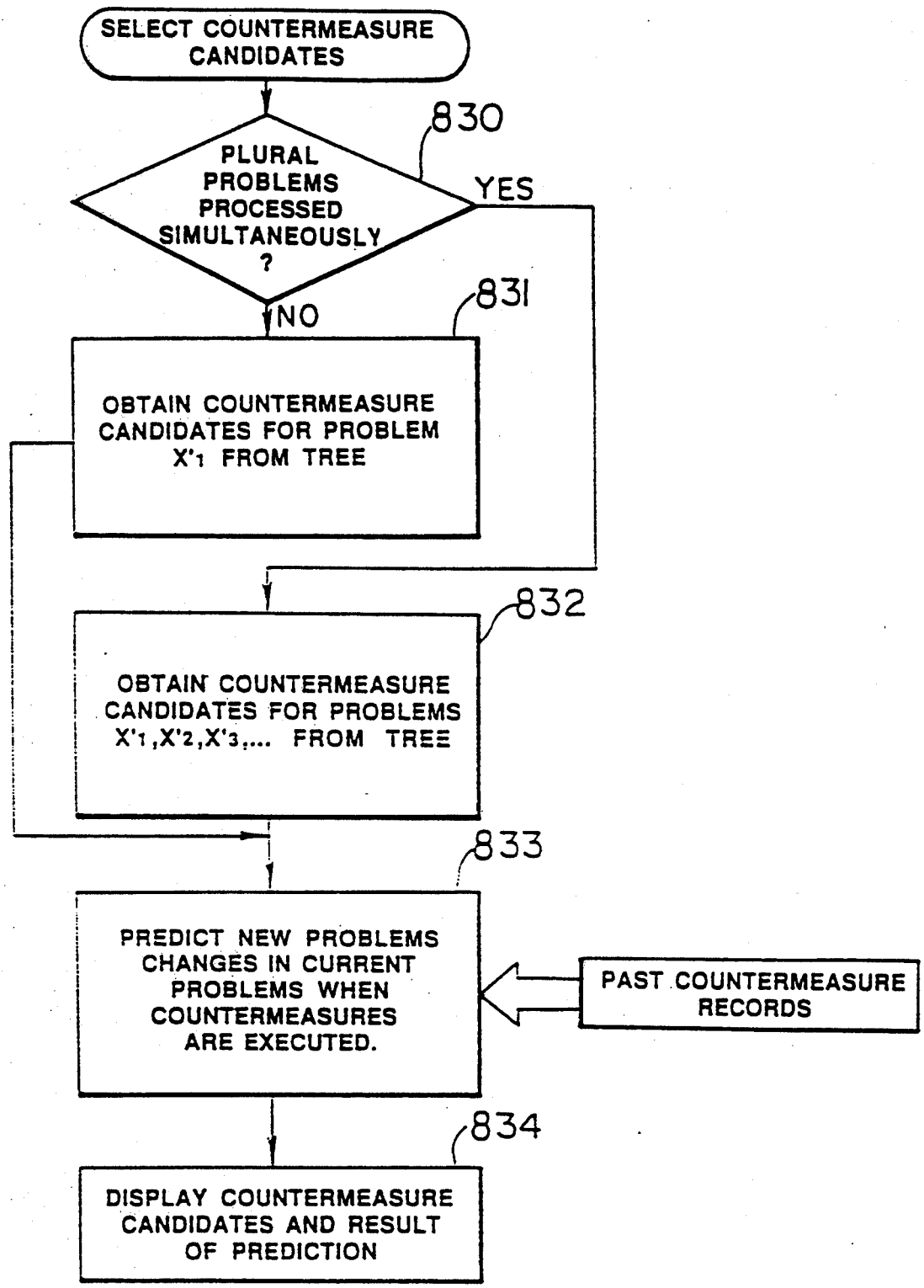
FIGS. 16 and 17 are detailed flowcharts of respective portions in the flowchart shown in FIG. 12.

In FIG. 16, first, at step 830, it is determined whether or not a countermeasure for a plurality of problems is taken. If it has been determined at step 830 that a countermeasure for a plurality of problems is not taken, the process proceeds to step 831, where candidates for countermeasure plans for the problem $X'_1$ having the highest priority order are obtained using the tree of countermeasures for problems stored in the knowledge base 22.

If it has been determined at step 830 that a countermeasure for a plurality of problem is taken, the process proceeds to step 832, where countermeasure plans which are common for the problems $X'_1, X'_2, X'_3$,--- -occurred are obtained using the tree of countermeasures for problems stored in the knowledge base 22.

At step 833, problems which have possibility to newly occur and changes in the current problems when the countermeasure plans obtained at step 831 or step 832 are executed are predicted. The prediction is performed according to the records of past countermeasures stored in the knowledge base 22. As a concrete example of the prediction, the processing shown in FIG. 10 described above may, for example, be used.

If problems supposed to newly occur due to the execution of respective countermeasure plans have been predicted at step 833, the process then proceeds to step 834. At step 834, the candidates for countermeasure plans obtained at step 831 or step 832 are displayed on the display 25 together with the result of the prediction at step 833.

Also at step 834, the operator 27 can select and execute a countermeasure plan displayed on the display 25 by operating the keyboard 26 and the like.

Next, the process proceeds to step 804. At step 804, it is determined whether or not the operator has selected and executed a countermeasure plan according to the processing for selecting a candidate for a countermeasure plan at step 803. If it has been determined at step 804 that a countermeasure plan has not been selected and executed, the process proceeds to step 805, where the processing for providing priority order for countermeasure plans is executed. The detail of the processing for providing priority order for countermeasure plans is shown in FIG. 17.

Figure 17:
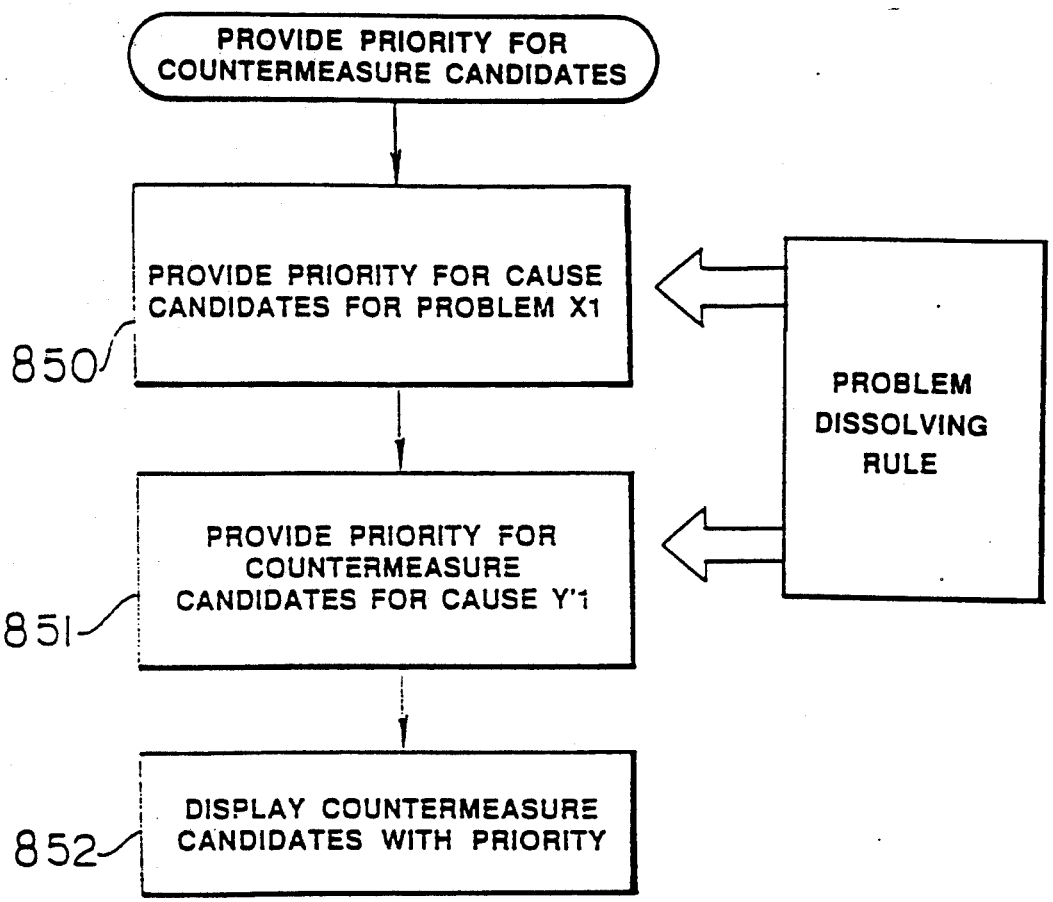

In FIG. 17, first, at step 850, priority order for candidates for causes for the problem $X'_1$ having the highest priority order are provided. At step 850, causes $Y_1, Y_2, Y_3$,---the problem $X'_1$ are inferred according to the rules for dissolving problems stored in the knowledge base 22, priority order is provided for the cause $Y_1, Y_2, Y_3$,-- -inferred, and the causes are rearranged according to the priority order to prepare a list of causes ($Y'_1, Y'_2, Y'_3$,---). As a detailed example of the processing for providing priority order for causes, the processing similar to that shown in FIG. 7 described above may be used.

Next, the process proceeds to step 851, where the processing for providing priority order for candidates for countermeasure plans for the cause $Y'_1$ having the highest priority order is executed. As for the processing for providing priority order for candidates for countermeasure plans, candidates for countermeasure plans for the cause $Y'_1$ are inferred according the rules for dissolving problems stored in the knowledge base 22, predetermined processing for providing priority order is performed for the candidates for countermeasure plans inferred, and a list of countermeasure plans ($Z'_1, Z'_2, Z'_3$,---) is prepared.

Subsequently, the process proceeds to step 852, where the candidates $Z'_1, Z'_2 Z'_3$,---for countermeasure plans are displayed on the display 25. At step 851, whether or not problems newly occur due to the execution of respective countermeasure plans may be predicted, and the result of the prediction may be displayed together with the above-described candidates for countermeasure plans.

Also at step 852, the operator can select and execute a countermeasure plan displayed on the display 25 by operating the keyboard 26 and the like.

Subsequently, at step 806, it is determined whether or not the above-described selection and execution of a countermeasure plan by the operator have been performed. If it has been determined at step 806 that the selection and execution of a countermeasure plan were not performed, the process proceeds to step 807. At step 807, the most suitable countermeasure plan inferred at step 805 is displayed.

When a countermeasure plan has been selected and executed at step 804, or when a countermeasure plan has been selected and executed at step 806, trial injection is performed at step 808. After the trial injection, the process proceeds to step 809, where after-treatment is executed.

The after-treatment is performed by inputting changes in situations of problems in response to inquiries from the system 20. That is, when problems having higher priority order compared with the problem as the object occur, or when the situation goes in a worse direction, changes in molding conditions due to the countermeasure plan $Z'_1$ executed are returned to original values, the leading plan for a countermeasure is removed from the above-described list of countermeasure plans to provide a list ($Z'_2$, $Z'_3$,—), and the countermeasure plan is switched to $Z'_2$. If the list of countermeasure plans becomes vacant, the leading cause is removed from the above-described list of causes to provide a list ($Y'_2$, $Y'_3$,—), the cause is switched to $Y'_2$, and priority order for countermeasure plans is provided again. If the current problem disappears in the course of this procedure, priority order for causes is provided for remaining problems which currently occur, and the above-described procedure is repeated until the list of problems becomes vacant.

Thus, according to the present embodiment, it is possible to easily infer the most suitable countermeasure plan, to perform the selection and execution by the operator even in the course of inference, and to promptly determine a countermeasure plan.

Figure 18:
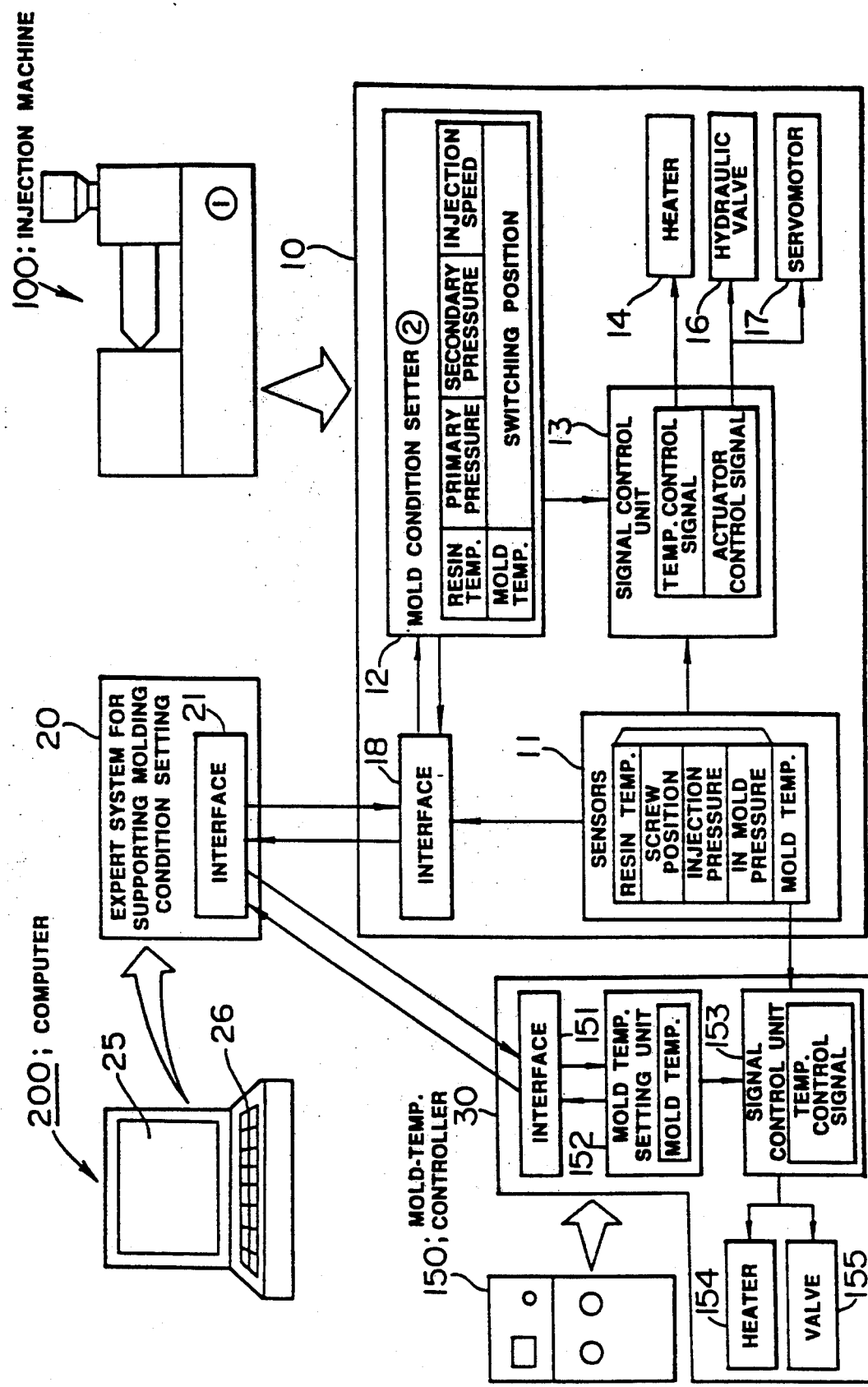
FIG. 18 is a configurational diagram showing the entire configuration of still another embodiment.

FIG. 18 shows still another embodiment of the present invention. In the present embodiment, a mold temperature controller 150 as well as an injection machine 100 are subjected to on-line connection to a computer 200. That is, an injection machine 100 includes a control unit 10, which comprises various kinds of sensors 11 for detecting the resin temperature, screw position, injection pressure, pressure within a mold and the like, a molding condition setting unit 12 for setting the resin temperature, mold temperature, primary pressure (injection pressure), secondary pressure (keeping pressure), injection speed, switching position for the primary pressure, secondary pressure and injection speed, and the like, a signal control unit 13 for generating a temperature control signal, an actuator control signal and the like, a heater 14 controlled by the temperature control signal from the signal control unit 13, a hydraulic valve controlled by the actuator control signal, a servomotor 17 and an interface 18 for the expert system 20 for supporting the setting of molding conditions.

The mold temperature controller 150 includes a control unit 30, which comprises a mold temperature setting unit 152 for setting mole temperature, a signal control unit 153 for generating a temperature control signal and the like, a heater 154 controlled in accordance with the control signal generated from the signal control unit 153, a valve 155, and an interface 151 for the expert system 20 for supporting the setting of molding conditions.

The expert system 20 for supporting the setting of molding conditions includes an interface 21 for the control unit 10 of the injection machine 100.

In this apparatus, the resin temperature, screw position, injection pressure, mold pressure and the like for the injection machine 100 are detected by the various kinds of sensors 11, detected outputs of which are supplied to the expert system 20 for supporting the setting of molding conditions via the interfaces 18 and 21. The outputs from the various kinds of sensors 11 are also supplied to the signal control unit 13. The signal control unit 13 forms temperature control signals for controlling the heater 14 and the temperature controller 150 and actuator control signals for controlling the hydraulic valve 16 and the servomotor 17 in accordance with outputs from the various kinds of sensors 11 and the resin temperature, cooling time, primary pressure, secondary pressure, injection speed, each switching position set at the molding condition setting unit 12.

Various kinds of setting values set at the molding condition setting unit 12 are supplied to the inferface 21 for the expert system 20 for supporting the setting of molding conditions via the interface 18.

The signal control unit 153 in the control unit 30 in the mold temperature controller 150 generates control signals for controlling the heater 154 and the valve 155 in accordance with the mold temperature set at the mold temperature setting unit 152. The mold temperature set at the mold temperature setting unit 152 is supplied to the interface 21 for the expert system 20 for supporting the setting of molding conditions via the interface 151.

When problems occur, the expert system 20 for supporting the setting of molding conditions infers the most suitable countermeasure for the occurrence of the problems according to the situations of the problems input from the keyboard 26, outputs from the various kinds of sensors 11 input from the interface 21, various kinds of setting values at the molding condition setting unit 12 and a set value for the mold temperature at the mold temperature setting unit 152, and transmits data for changing molding conditions to the molding condition setting unit 12 and the mold temperature setting unit 152 via the interfaces 21 and 18 or the interface 151 in order to execute the inferred countermeasure according to the inference.

On the display 25, the contents of input data by the keyboard 26, the data detected by the various kinds of sensors 11, the setting data by the molding condition setting unit 12, the setting data by the mold temperature setting unit 152, the contents of inference by the expert system 20 for supporting the setting of molding conditions and the like are displayed.

Figure 19:
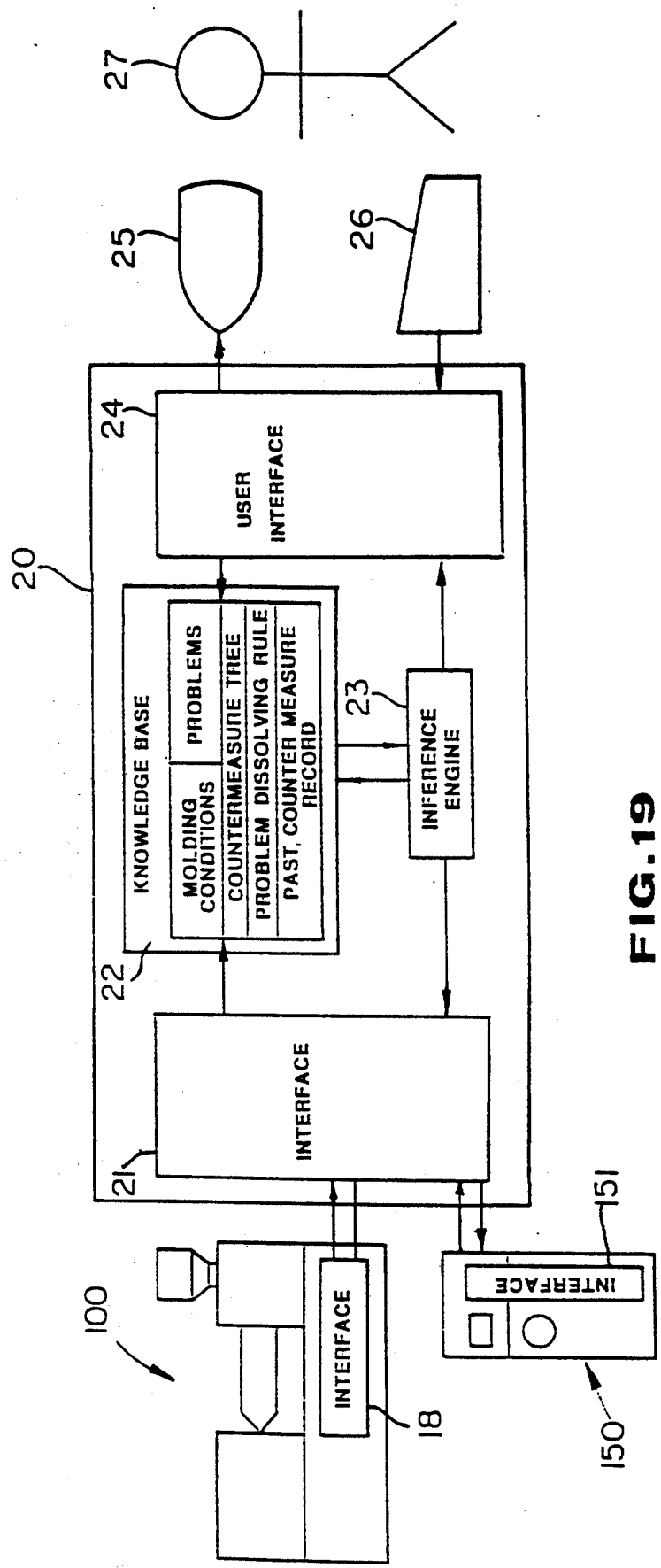
FIG. 19 is a configurational diagram made by paying attention to a part of the embodiment shown in FIG. 18.

FIG. 19 shows the schematic configuration of the expert system 20 for supporting the setting of molding conditions by functional blocks. The expert system 20 for supporting the setting of molding conditions comprises the interface 21 for the injection machine 100, a knowledge base 22 storing molding conditions, situations of problems, a tree of countermeasures for problems, rules for dissolving problems, records of past countermeasures and the like, a user interface 24 for the display 25 and the keyboard 26, and an inference engine 23 which performs a desired inference according to the knowledge stored in the knowledge base 22 and outputs the result of the inference to the interface 21, the user interface 24 and the knowledge base 22.

When problems have occurred in a product made by the injection machine 100, an operator 27 inputs situations of the problems to the expert system 20 for supporting the setting of molding conditions by the keyboard 26 while watching the situations on the display 25. The data indicating the situations of the problems input from the keyboard 26 is supplied to and stored in the knowledge base 22 via the user interface 24. Various kinds of data from the injection machine 100 are supplied to and stored in the knowledge base 22 via the interface 21. The inference engine 23 infers the most suitable countermeasure plan for the problems occurred according to the data stored in the knowledge base 22, and supplies the display unit 25 with the result of the inference via the user interface 24. The display unit 25 displays the result. The result of the inference is also transferred to the injection machine 100 and the mold temperature controller 150 via the interface 21, and molding conditions are changed in order to execute the countermeasure plan inferred.

Figure 20:
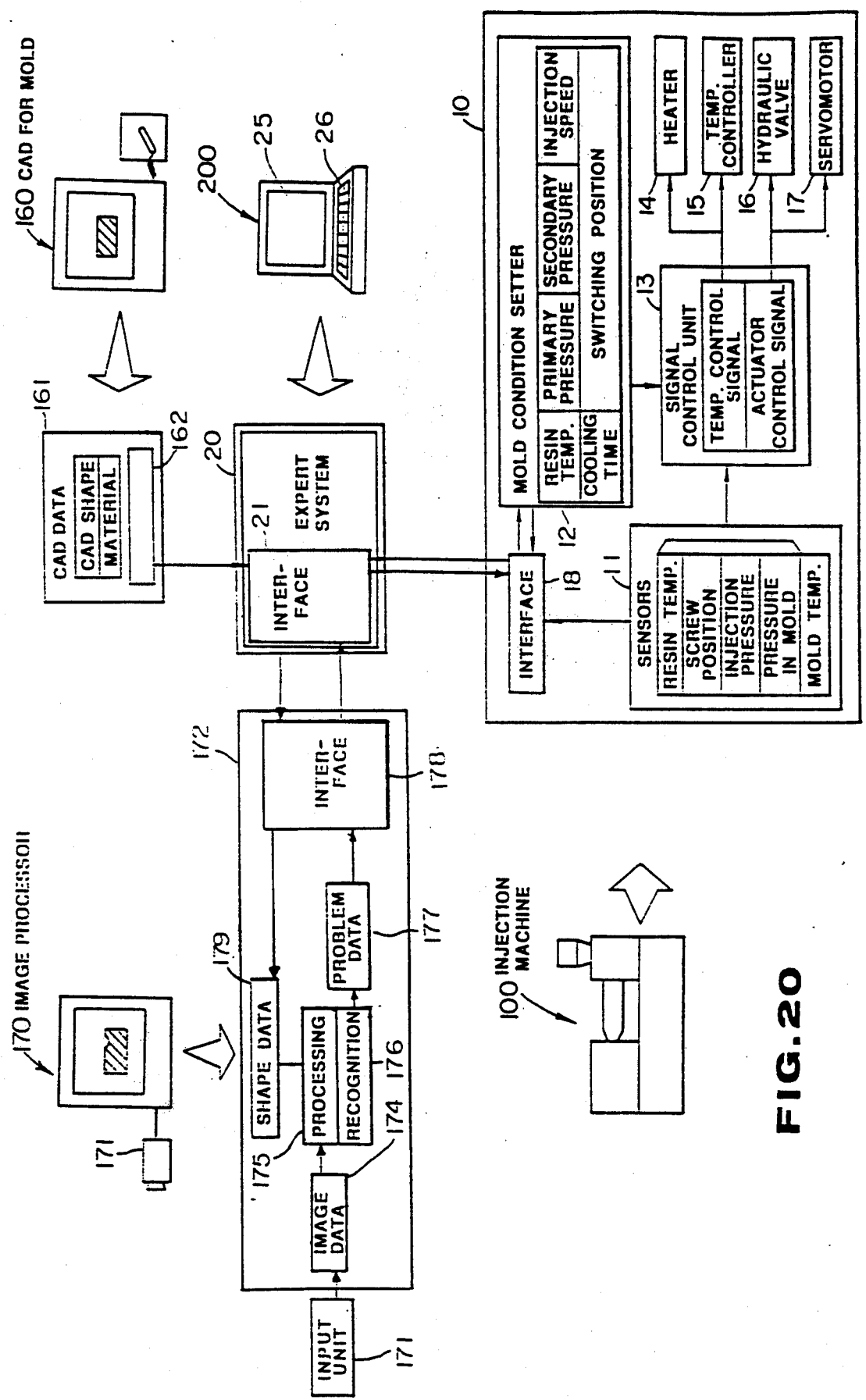
FIG. 20 is a configurational diagram showing the entire configuration of still another embodiment.

FIG. 20 shows still another embodiment of the present invention. In the present embodiment, an automatic designing apparatus (CAD for a mold) 160 for a mold and an image processing apparatus 170 as well as the injection machine 100 are subjected to on-line connection to the computer 200, which automatically determines situations of problems in a product, and the result of the determination is automatically input to the expert system 20 for supporting the setting of molding conditions.

First, since the configuration of the control unit 10 in the injection machine 100 is similar to that shown in FIG. 1, a detailed explanation thereof will be omitted.

The CAD 160 for a mold includes a storage unit 161 for storing CAD data for shapes indicating the shapes of molds, data indicating the designation of materials and the like. These CAD data for shapes, data for the designation of materials and the like are transmitted to the expert system for supporting the setting of molding conditions via the interface 162.

The image processing apparatus 170 includes a processing unit 172, which compares the shape of a molded product (a product) taken out of a mold which has been input via an image input apparatus 171, such as a television camera or the like, with data for the shape of the molded product which have been formed according to the CAD data for the shape from the above-described storage unit 161 in the CAD 160 for a mold to identify problems in the product, and transmits data indicating the problems to the expert system 20 for supporting the setting of molding conditions. That is, image data indicating the shape of the molded product input via the image input apparatus 171 are input to and stored in an image data memory 174. The expert system 20 for supporting the setting of molding conditions forms data for the shape of the molded product according to the CAD data for the shape sent from the storage unit 161 in the CAD 160 for a mold, and stores the data for the shape of the molded product in a memory 179 for data for the shapes of molded products in the processing unit 172 via the interface 21 and an interface 178. An image processing unit 175 compares image data stored in the image data memory 174 with data stored in the memory 179 for data for the shapes of molded products, and recognizes problems in the product by a problem recognizing unit 176. The problems in the product recognized by the problem recognizing unit 176 are stored in a memory 177 for situations of problems, and are transmitted to the expert system 20 for supporting the setting of molding conditions via the interface 178.

The expert system 20 for supplying the setting of molding conditions infers the most suitable countermeasure plan for the problems occurred according to the situations of the problems in the product input from the processing unit 172 in the image processing apparatus 170, outputs from various kinds of sensors 11 input from the control unit 10 in the injection machine 100 and various kinds of setting values at the molding condition setting unit 12.

In order to execute the countermeasure plan inferred at the expert system 20 for supporting the setting of molding conditions, data for resetting molding conditions are transmitted to the molding condition setting unit 12 in the control unit 10 in the injection machine 100.

Figure 21:
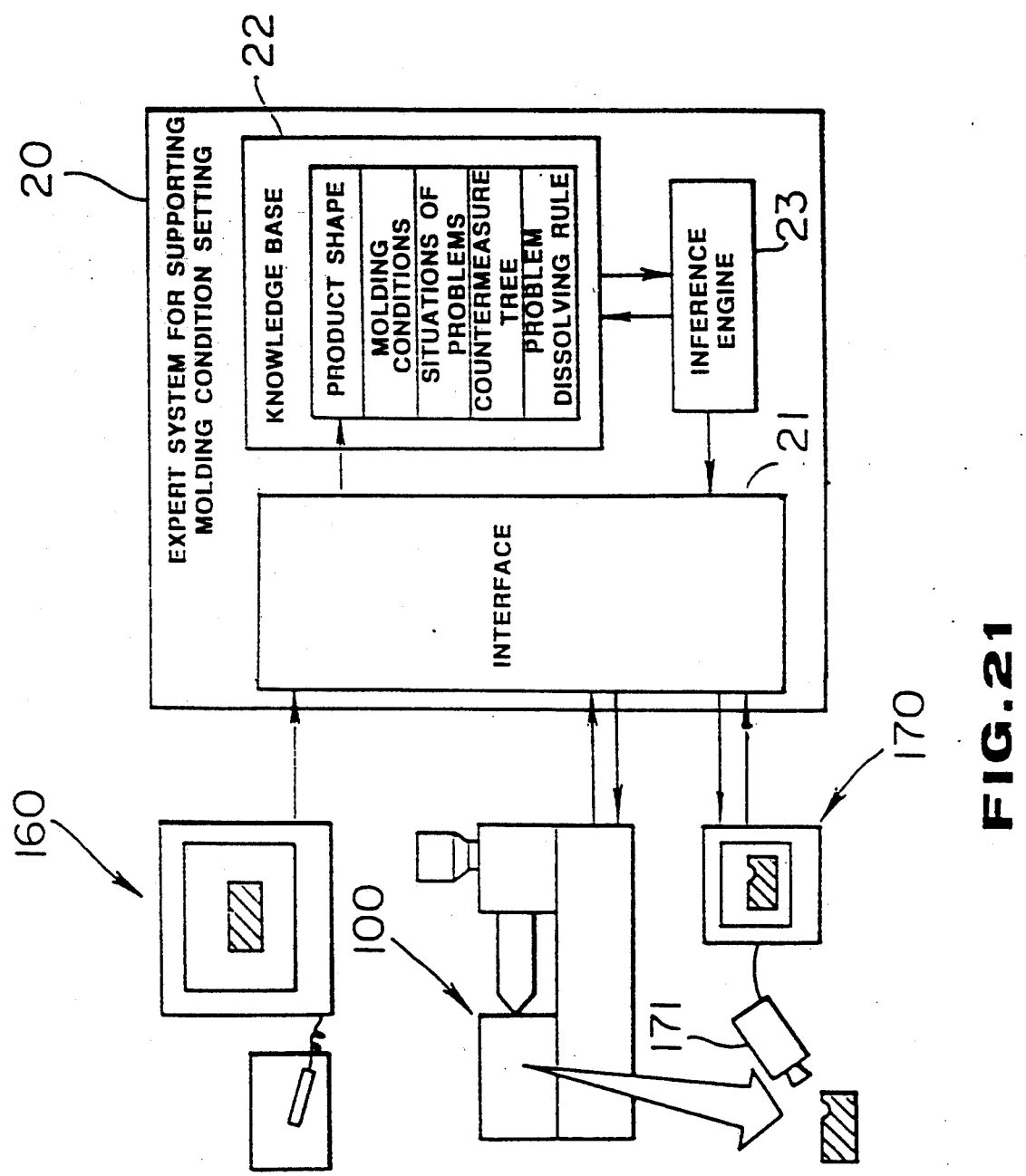
FIG. 21 is a configurational diagram made by paying attention to a part of the embodiment shown in FIG. 21.

FIG. 21 shows the schematic configuration of the expert system 20 for supporting the setting of molding conditions in functional blocks. The expert system 20 for supporting the setting of molding conditions comprises an interface 21 for the injection machine 100, the CAD 160 for a mold and the image processing apparatus 170, a knowledge base 22 which stores the shapes of molded products, molding conditions, situations of problems, a tree of countermeasures for problems, rules for dissolving problems and the like, and an inference engine 23 which performs a desired inference according to the knowledge stored in the knowledge base 22 and outputs the result of the inference to the interface 21 and the knowledge base 22.

Various kinds of data from the injection machine 100, data from the CAD 160 for a mold and data from the image processing apparatus 170 are supplied to and stored in the knowledge base 22 via the interface 21. The inference engine 23 infers the most suitable countermeasure plan for problems occurred according to the data stored in the knowledge base 22. As for the detail of this inference, a method similar to that in other embodiments described before may be used.

As described above, according to the present embodiment, inputs of problems and responses for inquiries relating to the problems by the operator become unnecessary, and the injection machine is controlled in the most suitable state without intervention of the operator.

Although, in the embodiments described above, explanations have been provided of cases in which the present invention is applied to the setting of molding conditions for injection machines, the present invention may of course be applied similarly to the setting of operation conditions for laser cutting machines, plasma cutting machines, various kinds of presses and the like.

Furthermore, although, in the embodiments described above, explanations have been provided of cases in which the present invention is applied to the setting of operation conditions of injection machines, these are only some examples to which the present invention is applied. Each part of a machine as an object of control may, for example, be directly controlled by the apparatus of the present invention. That is, according to the present invention, a machine as an object of control can be operated in the most suitable state without a need for particular knowledge and skill, and, at the same time, portions for which human judgment are required is made as small as possible. Hence, it is possible to consider various modified examples according the present invention.

POSSIBILITY FOR INDUSTRIAL UTILIZATION

According to the present invention, when problems in a machine as an object of control and problems in a product produced by the machine as an object of control occur, it is possible to promptly execute proper processing. Furthermore, any particular skill is unnecessary for the operation of an apparatus according to the present invention, and it is possible to effectively operate a machine as an object of judgment in the most suitable state even if no high-level specialists exist. For example, when the present invention is applied to the setting of operation conditions for an injection machine, it is possible to set the operation conditions in the most suitable state in a short time without having any particular knowledge and skill. In addition, since the apparatus of the present invention has a configuration in which experiences are newly accumulated sequentially within the apparatus, it also becomes possible to succeed and accumulate the related technique.

What is claimed is:

1. A control and problem solving apparatus having an inference function comprising:
    a plurality of sensor means for detecting the status of respective units of a machine;
    input means for inputting situations of problems when the problems occur in said machine or a product produced by said machine;
    inference means including storage means storing information relating to situations of various kinds of operations of said machine and a plurality of countermeasures for said problems, said inference means prioritizing said problems and causes for said problems, and prioritizing the countermeasures for said causes according to the situations of the problems input by said input means;
    said sensor means detecting the status of respective units of said machine detected by said sensor means, the status information being stored in said storage means, said inference means inferring a countermeasure which is most suitable;
    displaying means for displaying said prioritized countermeasures; and
    control means for outputting various kinds of control signals to said machine in accordance with the countermeasures inferred by said inference means.

2. A control apparatus having an inference function according to claim 1, wherein the inference means includes means for renewing the contents stored in the storage means in accordance with the countermeasures inferred and a result of the most suitable countermeasures.

3. A control apparatus having an inference function according to claim 1 or 2, wherein the inference means includes means for inferring whether or not other problems occur for the countermeasures inferred referring to the contents stored in the storage means, and for inferring other countermeasures in place of said most suitable countermeasures when possibility for the occurrence of other problems is high.

4. A control apparatus having an inference function according to claim 1, wherein the inference means includes means for inferring countermeasures which are common for problems when a plurality of problems simultaneously occur, and for inferring a countermeasure which is most suitable from among said countermeasures inferred.

5. A control apparatus having an inference function comprising:
    a plurality of sensor means for detecting the status of respective units of a machine;
    setting means for setting operating conditions of said machine;
    input means for inputting situations of problems and causes of the problems when the problems occur in said machine or in a product produced by said machine;
    inference means including storage means storing data to various solutions for said problems, said inference means including means for providing a priority order for said problems; and means for providing a priority order for causes according to the situations of the problems; means for providing a priority order for said solutions; the status of respective units of said machine being detected by said sensor means and the status information being stored in said storage means, means for inferring a solution which is most suitable; and
    means for changing the operating conditions of said machine set by said setting means in accordance with the solution inferred by said inference means.

6. A control apparatus having an inference function according to claim 5, wherein said inference means includes means for renewing said data stored in the storage means in accordance with said solution inferred and the result of the solution.

7. A control apparatus having an inference function according to claim 5 or 6, wherein said inference means includes means for determining whether or not other problems occur for the solution inferred by reference to said data stored in said storage means, and for inferring other solutions in place of said solution when the possibility for the occurrence of other problems is high.

8. A control apparatus having an inference function according to claim 5, wherein the inference means includes means for selecting solutions which are common for problems when a plurality of problems simultaneously occur, and for selecting a solution which is most suitable from among said solutions inferred.

9. A control apparatus for control and problem solving, said apparatus having an inference function comprising:
    input means for inputting situations of problems in a product;
    inference means including storage means for storing information relating to situations of said problems in the product, causes corresponding to respective situations of the problems and countermeasure plans corresponding to respective causes, means for determining countermeasure plans which are most suitable according to said information stored in said storage means and the situations of said problems;
    display means for displaying countermeasure plans in the course of inference while inference by said inference means is being processed;
    automatic selection means for selecting an arbitrary countermeasure plan from among the countermeasure plans displayed on said display means; and,
    means for manually overriding said selection means to select another countermeasure.

10. A control apparatus having an inference function according to claim 9, wherein
    said inference means includes selection means for selecting candidates for countermeasure plans and prediction means for predicting problems which will occur when said selected candidates for countermeasure plans are executed, and wherein
    said display means displays the candidate for countermeasure plans selected by said selection means together with the problems predicted by said prediction means.

11. A control apparatus having an inference function according to claim 10, wherein said prediction means predicts problems which will occur when a plurality of candidates for countermeasure plans are simultaneously executed.

12. A control apparatus having an inference function according to claim 9 wherein
said inference means includes prioritizing means for providing an order of priority for candidates for countermeasure plans, and wherein
said display means displays the candidate for countermeasure plans together with the priority order inferred by said prioritizing means.

13. A control apparatus having an inference function according to claim 9, wherein said inference means includes means for renewing said information stored in the storage means in accordance with the result of controlling an injection molding machine according to a countermeasure plan.

14. A apparatus for the control of an injection molding machine, said apparatus having an inference function comprising:
input means for inputting situations of problems in a product being molded by said machine;
inference means including storage means for storing information relative to said situations of said problems, causes corresponding to respective situations of said problems and countermeasure plans corresponding to respective causes, said inference means selecting countermeasure plans which are most suitable according to said information stored in said storage means and said situations of said problems;
display means for displaying countermeasure plans in the course of inference while said inference means is selecting;
a selection means for automatically selecting an arbitrary countermeasure plan from among the countermeasure plans displayed on said display means; and
control means for controlling said injection molding machine according to said selected countermeasure plan, and for performing the control of the injection machine according to the most suitable countermeasure plan inferred by said inference means when a countermeasure plan has not been selected by said selection means.

15. A control apparatus having an inference function comprising:
a first group of sensors for detecting the status of the respective units of an injection molding machine;
a second ground of sensors for detecting the status of the respective units of a peripheral unit of said injection molding machine;
input means for inputting situations of problems in a product being made;
inference means including storage means storing data relating to the situations of the problems in the product, causes corresponding to respective situations of the problems and countermeasure plans corresponding to respective causes, said inference means thereby selecting countermeasure plans which are most suitable according to said data, the situation of the problems input by said input means, outputs from said first group of sensors and outputs from said second group of sensors; and
control means for automatically controlling said injection molding machine and said peripheral unit according to said countermeasure plans selected by said inference means, said control means having a manual override for selecting another countermeasure plan.

16. A control apparatus having an inference function according to claim 15, wherein said peripheral unit is a mold-temperature controller.

17. A control apparatus having a decision making function comprising:
an image processing apparatus for forming first data relating to a shape of a product by performing image processing of an image signal obtained by imaging the product;
an automatic designing apparatus for a mold for automatically preparing a design of a mold;
detection means for comprising said first data with a second set of data relating to a shape of the product obtained by said automatic designing apparatus for a mold, and relating to the detection of problems in the product being molded according to the comparison;
decision making means including storage means storing a third set of data relating to situations of potential problems in the product being molded, causes for respective situations of the problems and countermeasure plans corresponding to respective causes, for selecting countermeasure plans which are most suitable according to and said first, second, and third data; and
control means for controlling said injection molding machine according to the countermeasure plans selected by said decision making means.

* * * * *